(12) United States Patent
Barcena et al.

(10) Patent No.: US 12,090,571 B2
(45) Date of Patent: Sep. 17, 2024

(54) APPARATUS AND METHOD FOR PROCESSING CARDBOARD

(71) Applicants: TALENS SYSTEMS, S.L.U., Guipúzcoa (ES); MACARBOX, S.L.U., Guipúzcoa (ES)

(72) Inventors: Alejandro Barcena, Guipúzcoa (ES); Jesús Domínguez, Guipúzcoa (ES); Javier Iturriza, Guipúzcoa (ES); Antonio Izaguirre, Guipúzcoa (ES)

(73) Assignees: TALENS SYSTEMS, S.L.U., Guipúzcoa (ES); MACARBOX, S.L.U., Guipúzcoa (ES)

( * ) Notice: Subject to any disclaimer, the term of this patent is extended or adjusted under 35 U.S.C. 154(b) by 924 days.

(21) Appl. No.: 17/045,890

(22) PCT Filed: Apr. 8, 2019

(86) PCT No.: PCT/EP2019/058816
§ 371 (c)(1),
(2) Date: Oct. 7, 2020

(87) PCT Pub. No.: WO2019/197341
PCT Pub. Date: Oct. 17, 2019

(65) Prior Publication Data
US 2021/0138582 A1 May 13, 2021

(30) Foreign Application Priority Data

Apr. 10, 2018 (EP) ..................................... 18382246

(51) Int. Cl.
*B23K 26/082* (2014.01)
*B23K 26/00* (2014.01)
(Continued)

(52) U.S. Cl.
CPC ........ *B23K 26/082* (2015.10); *B23K 26/0006* (2013.01); *B23K 26/0838* (2013.01); *B23K 26/402* (2013.01)

(58) Field of Classification Search
CPC .............. B23K 26/082; B23K 26/0006; B23K 26/0838; B23K 26/402; B31F 2201/072;
(Continued)

(56) References Cited

U.S. PATENT DOCUMENTS 6,420,675 B1 * 7/2002 Lizotte ................. B23K 26/082
219/121.73
6,809,290 B2 * 10/2004 Gross ................... B23K 26/073
219/121.73
(Continued)

FOREIGN PATENT DOCUMENTS

EP 2532468 A2 12/2012
EP 2700583 A1 2/2014
(Continued)

OTHER PUBLICATIONS

Extended European Search Report issued Oct. 25, 2018 re: Application No. 18382246.9, pp. 1-12, citing: WO 2014/045271 A1, WO 99/29496 A1, EP 2 532 468 A2, WO 2016/189136 A1, WO 2008/095212 A1, EP 2 700 583 A1 and WO 97/37837 A1.
(Continued)

*Primary Examiner* — Sameh Tawfik
(74) *Attorney, Agent, or Firm* — CANTOR COLBURN LLP

(57) ABSTRACT

A method for processing cardboard includes the steps of irradiating a surface of a cardboard blank with a first laser in order to remove material from the cardboard blank according to a first pattern. The first laser is irradiated with a first laser power and with a laser beam thereof being scanned with a first scanning speed. The first laser power is greater (Continued)

than or equal to 0.5 kW. The first scanning speed is greater than or equal to 2000 mm/s and less than or equal to 25000 mm/s. The method also includes the step of irradiating the surface of the cardboard blank with the first laser in order to remove material from the cardboard blank according to the first pattern and is carried out while the cardboard blank is being conveyed.

10 Claims, 8 Drawing Sheets

(51) Int. Cl.
*B23K 26/08* (2014.01)
*B23K 26/402* (2014.01)

(58) Field of Classification Search
CPC ............ B31F 2201/0717; B31B 50/14; B31B 50/144; B31B 50/22; B31B 50/254
USPC ........................................................ 493/341
See application file for complete search history.

(56) References Cited

U.S. PATENT DOCUMENTS

| | | | | |
|---|---|---|---|---|
| 7,078,650 | B2* | 7/2006 | Gross | B23K 26/0676 219/121.77 |
| 7,585,791 | B2* | 9/2009 | Tanaka | H01L 21/02422 438/795 |
| 7,626,181 | B2* | 12/2009 | Visser | G03F 7/70041 250/492.1 |
| 7,649,156 | B2* | 1/2010 | Lee | H01L 21/268 219/121.73 |
| 11,327,461 | B2* | 5/2022 | Shapiro | B23K 37/0408 |
| 2010/0282722 | A1* | 11/2010 | Ramsayer | B23K 26/0823 219/121.64 |
| 2010/0326974 | A1* | 12/2010 | Ota | C21D 9/08 219/121.81 |
| 2012/0121802 | A1* | 5/2012 | Zimmer | C08L 23/02 118/697 |
| 2020/0328237 | A1* | 10/2020 | Lee | H01L 21/02675 |
| 2021/0107091 | A1* | 4/2021 | Riechel | B23K 26/0624 |
| 2022/0055156 | A1* | 2/2022 | Tanaka | B23K 26/0823 |
| 2022/0355417 | A1* | 11/2022 | Lee | B23K 26/362 |

FOREIGN PATENT DOCUMENTS

| | | | |
|---|---|---|---|
| WO | 9737837 | A1 | 10/1997 |
| WO | 9929496 | A1 | 6/1999 |
| WO | 2008095212 | A1 | 8/2008 |
| WO | 2014045271 | A1 | 3/2014 |
| WO | 2016189136 | A1 | 12/2016 |
| WO | 2017080677 | A1 | 5/2017 |

OTHER PUBLICATIONS

International Search Report issued Jun. 6, 2019 re: Application No. PCT/EP2019/058816, pp. 1-4, citing: WO 2014/045271 A1, WO 99/29496 A1, EP 2 532 468 A2, WO 2016/189136 A1, WO 2008/095212 A1, EP 2 700 583 A1 and WO 97/37837 A1.
Written Opinion issued Jun. 6, 2019 re: Application No. PCT/EP2019/058816, pp. 1-8, citing: WO 2014/045271 A1, WO 99/29496 A1, EP 2 532 468 A2, WO 2016/189136 A1 and WO 2008/095212 A1.

* cited by examiner

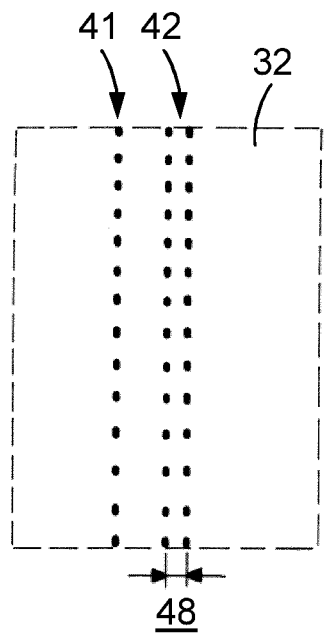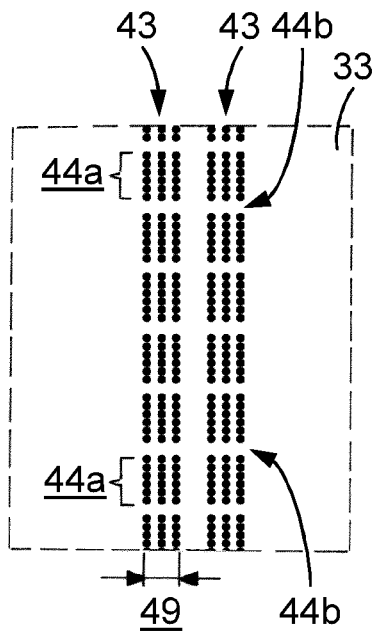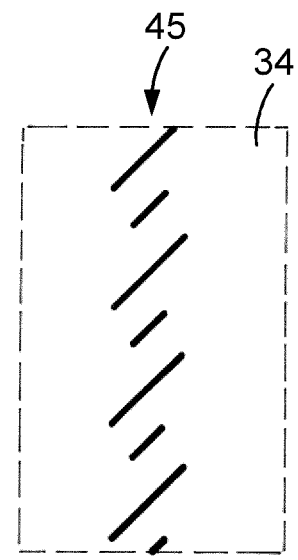
FIG. 7    FIG. 8    FIG. 9
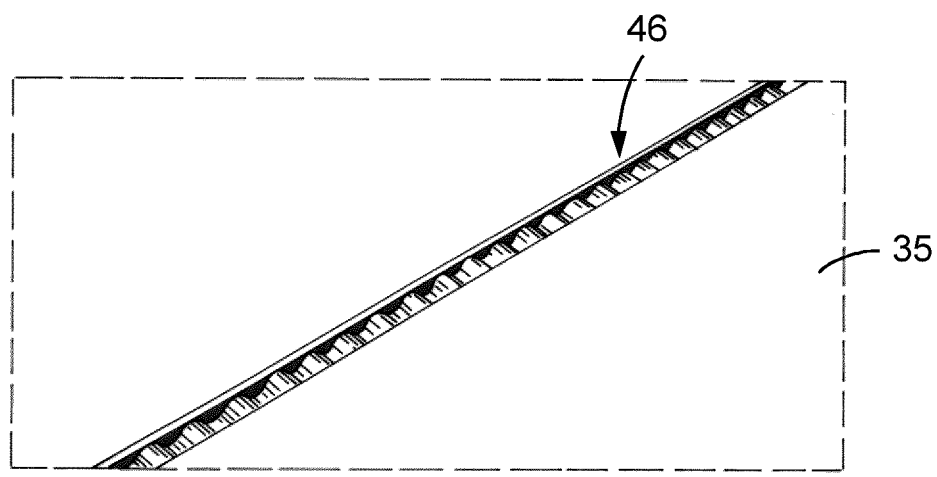
FIG. 10

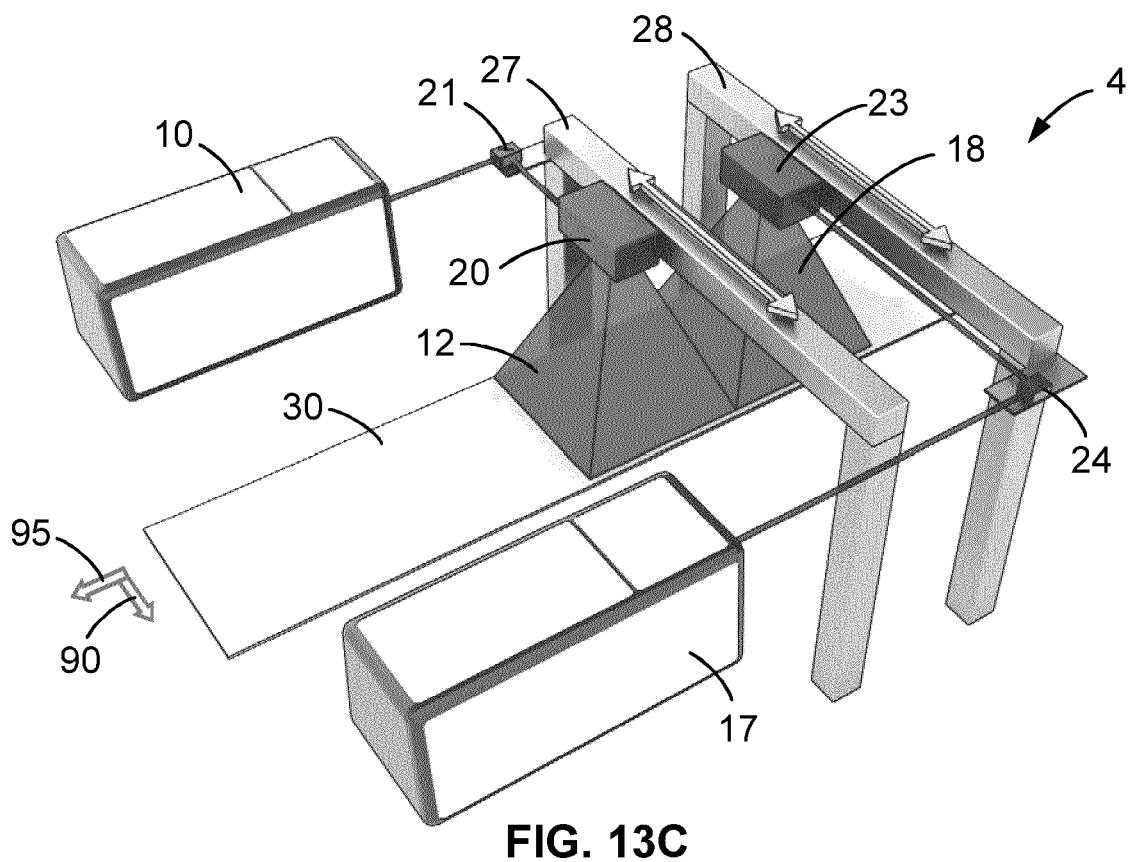
FIG. 13C
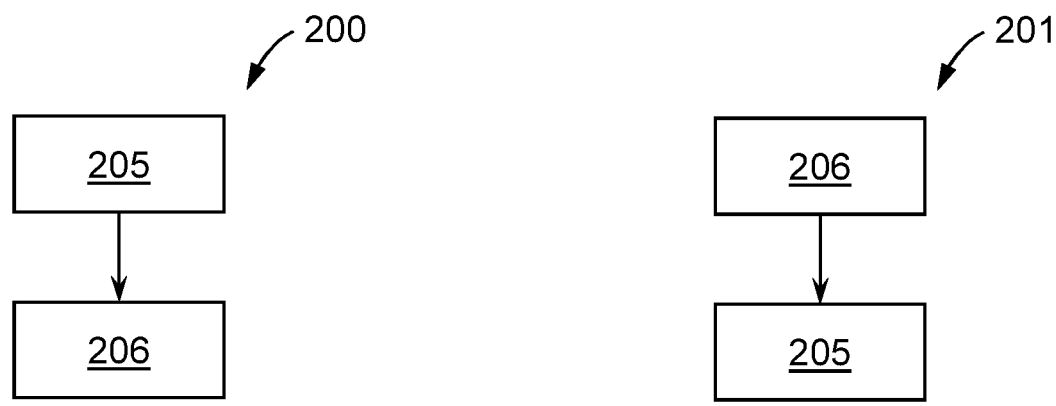
FIG. 14
FIG. 15

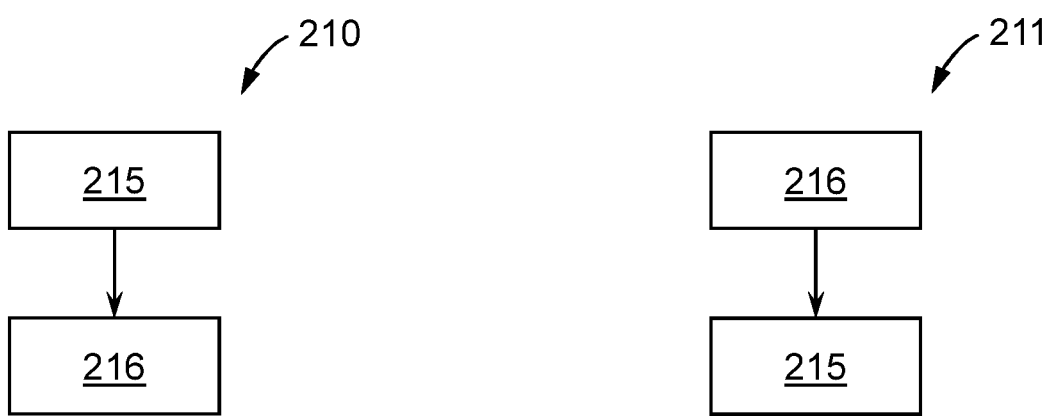
FIG. 16          FIG. 17

APPARATUS AND METHOD FOR PROCESSING CARDBOARD

TECHNICAL FIELD

The present disclosure relates to the field of cardboard processing. More specifically, the present disclosure relates to an apparatus and a method for processing cardboard with laser radiation.

BACKGROUND

Cardboard is one of the most used materials for manufacturing containers. Cardboard containers are produced from large cardboard blanks that need to be cut according to the contour of the containers, and folded according to a folding pattern so as to form the containers.

Processing cardboard in said fashion in order to produce cardboard containers is time-consuming. Accordingly, mass production of cardboard containers in the past involved the use of die cutting machines: dies with the contour of the container and the folding pattern were manufactured, and provided inside a press for cutting or providing fold lines according to said dies. The use of dies and presses made possible to produce cardboard containers in series, but it was not a cost-effective solution when small batches needed to be manufactured as the cost and the time incurred in producing the die was significant. Further, the dies wore off over time thereby decreasing the quality of the produced goods progressively.

There have been some developments in the prior art to process cardboard with laser, either by removing material of the cardboard or by evaporating moisture within the cardboard.

Patent document WO-97/37837-A1 relates to producing objects from a flat material and in which notches for folding the material are formed by means of laser radiation. The flat material may then be folded along said notches. The patent document is silent regarding the operation of the laser.

Patent document WO-99/29496-A1 discloses providing cardboard with fold lines by burning part of the cardboard using a laser. When forming the fold lines with the laser, in order to avoid generation of smoke and that the edges adjacent to the fold lines are burned, the laser is scanned several times along the fold line so that material in the fold line is progressively removed.

Patent document WO-2017/080677-A1 describes a method for locally modifying a structure of a paperboard. A laser radiation penetrates into a penetrating region of the paperboard so that moisture in a core section thereof evaporates and, thus, modifies the structure of the penetrating region.

The developments of the prior art, however, do not make possible to process cardboard quickly enough for incorporating them into manufacturing processes. In the case of cardboard containers, most of these are disposable, meaning that they are not reused, and therefore packaging any product requires a new cardboard container; so further efforts need to be made in cardboard processing in order to cope with the large demands for cardboard containers. Further, prior art development only focus on providing fold lines and, hence, they do not provide an alternative to cutting cardboard blanks using dies and presses.

There is an interest in providing apparatuses and methods with which cardboard may be processed quickly, both in the forming of fold lines and in the cutting of the cardboard blanks. There is also an interest in processing cardboard while cardboard blanks are being conveyed so that manufacturing processes are not slowed down as a result of having to process the cardboard when it is completely static.

SUMMARY

A first aspect of the disclosure relates to a method for processing cardboard, comprising:
  irradiating a surface of a cardboard blank with a first laser in order to remove material from the cardboard blank according to a first pattern, the first laser irradiating with a first laser power and with a laser beam thereof being scanned with a first scanning speed;
  the first laser power is greater than or equal to 0.5 kW;
  the first scanning speed is greater than or equal to 2000 mm/s and less than or equal to 25000 mm/s.

The irradiation of the surface of the cardboard blank with the first laser, with the first laser power and with its laser beam being scanned with the first scanning speed, makes possible to remove a portion of the material that is present in the surface of the cardboard blank; material is removed as the laser beam, and thus, the spot of the first laser is scanned on the surface of the cardboard blank. That is, taking a cross-section of the cardboard blank in the portion where the spot of the laser beam is, at least a portion of a ply (including one or some plies) of the cardboard is removed.

The combination of the first laser power and the first scanning speed is such that the amount of energy deposited on the different portions (the portions of the cardboard blank that are irradiated by the laser beam of the first laser upon scanning) is sufficient to burn the material (e.g. a portion of a ply, one ply, some plies) of the cardboard blank and not to burn cardboard adjacent to said portions, that is, the portions adjacent to the trajectory followed by the laser spot. In this sense, in many cases a single pass with the laser beam is enough to remove one ply (or a portion thereof) or several plies of the cardboard blank, and thus the risk of burning contours of the path or even burning all the plies of the cardboard is reduced.

The amount of material to be removed depends on both the number of plies of the cardboard that need to be removed, the thickness of the plies, and the amount of energy that needs to be deposited, but it also depends on the overall length of the first pattern. Such high laser scanning speeds and the simplicity of scanning the laser beam once in many occasions in order to remove the material result in a faster processing of cardboard with respect to methods of the prior art. A complexity of the first pattern in terms of number of segments, shape and level of detail thereof may also slow down the processing of cardboard, but owing to the combination of the first laser power with the first scanning speed the processing is also reduced with the present method because each portion of the first pattern may be reached faster and less time irradiating it is necessary.

In many cases, the irradiation of cardboard with the first laser power and with the laser beam scanned with the first scanning speed results in the removal of at least a portion of a ply of the cardboard blank according to the first pattern, thereby making possible to provide the cardboard blank with fold lines (i.e. lines along which folding may be carried out). Fold lines are necessary in containers made of cardboard since these lines are used, precisely, for providing the container shape as folded. In this sense, other than for mass processing of cardboard, speeding up the processing of cardboard is also convenient for mass production of cardboard containers, for instance, as cardboard blanks need to be provided with fold lines when manufacturing cardboard containers in series. Thus, the method of the present disclosure also provides a reduction in the time it takes to manufacture a unit of a cardboard container, and hence more units may be manufactured in same or even less time than in methods of the prior art.

Scanning speed refers to the speed of the spot of the laser beam on the surface of the cardboard blank. In addition, even though the methods and apparatuses of the present disclosure refer to a cardboard blank, it is readily apparent that same procedures and apparatuses may be applicable to products derived from a cardboard blank, for instance cardboard containers, and/or they may also be applicable for manufacturing such products.

In some embodiments, the first laser power is greater than or equal to 1.0 kW and/or 2.0 kW. In some embodiments, the first laser power is less than or equal to at least one of: 10.0 kW, 5.0 kW, 3.0 kW, and 2.0 kW.

In some embodiments, the first scanning speed is greater than or equal to 5000 mm/s and/or 7500 mm/s. In some embodiments, the first scanning speed is less than or equal to at least one of: 15000 mm/s, 10000 mm/s, 7500 mm/s, and 5000 mm/s.

In some embodiments, the surface of the cardboard blank irradiated with the first laser to remove material from the cardboard blank according to the first pattern is irradiated with the first laser a single time. That is, material is removed from the cardboard blank according to the first pattern with a single pass of the laser irradiating the surface thereof.

In some embodiments, at least a portion of the surface of the cardboard blank irradiated with the first laser to remove material from the cardboard blank according to the first pattern is irradiated with the first laser a plurality of times.

Irradiation of at least a portion of the surface multiple times makes possible to provide the cardboard blank with engravings having different depths; engravings may be provided as folding lines, as decorative elements or as elements for traceability purposes. At each pass of the laser beam of the first laser, further plies (or portions thereof) of the cardboard blank are burned. As more or less material is removed from the cardboard blank, the depths of the recesses formed is adjusted. The engravings may comprise one of: letters, symbols, identification codes (e.g. barcode, QR code, etc.), and a combination thereof.

In some embodiments, the first pattern comprises a plurality of segments. In some of these embodiments, the segments of the plurality of segments are one of: continuous lines, discontinuous lines, and a combination thereof.

In some of these embodiments, at least two segments of the plurality of segments are parallel, a separation of the at least two segments being less than or equal to a thickness of the cardboard blank, the separation being measured from a central axis of one segment to a central axis of the other segment, each central axis extending along a length of the segment thereof.

Fold lines may be provided with segments in the form of continuous and/or discontinuous lines. Discontinuous lines may be preferred insofar as the overall integrity of the cardboard blank is concerned because less material is removed. Thus, as the structure of the cardboard blank is modified less in comparison to providing fold lines as solid lines (i.e. continuous lines), upon folding the cardboard blank along the fold lines the cardboard blank is less prone to breaks.

Providing, by material removal, at least two discontinuous lines that are parallel and closely spaced apart may be convenient for reduced weakening of the internal structure of the cardboard blank. Even though there are at least two discontinuous lines, due to their proximity they work as a single fold line rather than two fold lines (or more fold lines if there are more than two such discontinuous lines), meaning that the cardboard blank is sufficiently rigid to only fold once despite the existence of at least two discontinuous lines.

The at least two discontinuous lines cooperate in the folding, but each of these discontinuous lines may feature a folding capacity that is lower (i.e. a resistance of the cardboard against being folded is greater) than a folding capacity of single lines that are either continuous or discontinuous (which are to be used for folding the cardboard without cooperation of any other line). This is because the overall folding capacity results from the combination of the at least two discontinuous lines; each discontinuous line weakens a portion of the structure where it is formed and thus with the combination of discontinuous lines that are proximate the cardboard then tends to fold in that portion. Hence, in comparison to such single lines, each discontinuous line of the at least two discontinuous lines may comprise: fewer spots having material removed therefrom; same number of spots but each with a smaller surface having material removed therefrom; or even same number of spots with same surface but having less material removed therefrom (i.e. fewer plies or smaller portion of ply or plies of cardboard). This, in turn, makes the cardboard blank sturdier because more material is present, particularly in the area with the fold line, and it is less likely that the cardboard blank will break upon folding.

The folding capacity of the adjacent discontinuous lines is also dependent on the thickness of the cardboard blank and the maximum angle up to which a fold line may be folded, therefore a separation between the discontinuous lines that is greater than the thickness of the cardboard blank generally results in poor foldability.

In some embodiments, the separation of the at least two segments is less than a diameter of a spot of the laser beam of the first laser, and greater than 50% of the diameter of the spot of the laser beam of the first laser, the separation being measured from a central axis of one segment to a central axis of the other segment.

When material is removed from the cardboard blank such that the first pattern comprises parallel segments (either as continuous or discontinuous lines) that are spaced apart a distance ranging from the diameter of the spot of the laser beam to half the diameter of the spot of the laser beam, thicker lines are formed in the cardboard blank because the segments have an overlapping portion. The formation of thicker lines may be convenient for increasing the foldability thereof since less material is present in the portion of the cardboard blank along which it will be folded.

By providing more parallel segments that are closely separated, the resulting line becomes thicker, so more than two parallel segments may be provided in the pattern in this fashion. Forming such lines by irradiating according to each of these segments avoids enlarging the spot diameter and reducing the scanning speed (so that the necessary energy may be deposited for removing material), which would otherwise increase the probability of burning the cardboard blank beyond the part corresponding to the first pattern to be formed.

In some embodiments, the step of irradiating the surface of the cardboard blank with the first laser in order to remove material from the cardboard blank according to the first pattern is carried out while the cardboard blank is being conveyed.

The processing of cardboard is carried out while the cardboard blank is moved with, for instance, a conveyor that may be suitable for successively and/or continuously conveying cardboard blanks. In this sense, in the method different cardboard blanks may be conveyed, or a cardboard roll may be conveyed as a continuous blank for processing thereof.

During a period of time in which the cardboard blank is being conveyed, the cardboard blank is within an area reachable by the laser beam of the first laser. When the cardboard blank is within this area, the first laser irradiates the surface of the cardboard blank in order to remove material therefrom according to the first pattern. The cardboard blank may not be completely within the area when the first laser starts irradiating the surface thereof, that is, the cardboard blank may be partially within the area when laser irradiation starts. Accordingly, the portion of the first pattern corresponding to the surface of the cardboard blank within the area is first scanned with the laser beam of the first laser so as to remove material therefrom. As the cardboard blank keeps being conveyed, the laser beam is further scanned so that the first laser irradiates the surface according to the remaining portion of the first pattern.

The scanning of the laser beam of the first laser may be adjusted by a unit (e.g. an FPGA) controlling both the first laser and a first scanner coupled thereto based on the motion of the cardboard blank. To this end, the unit may adjust the scanning of the laser beam of the first laser such that rotating speeds of the mirrors in the first scanner are increased or reduced depending on the portion of the first pattern being irradiated depending on the conveyance of the cardboard blank. An encoder in the conveyor provides data relative to the operation of the conveyor such as position and velocity thereof, and thus the first scanner may scan the laser beam either compensating for the motion of the conveyor or superposing the scanning motion and the motion of the conveyor for achieving faster movements of the laser spot, for instance. Further, means for detecting a piece (e.g. an infrared photoelectric cell) on the conveyor provide data relative to the position of the cardboard blank on the conveyor so that the first scanner may scan the laser beam based on said position. The unit processes the data from the encoder and the means for detecting the piece and operates the first laser and the first scanner such that the material of the cardboard blank may be removed according to a pattern (e.g. the first pattern, a second pattern, etc.) in a particular portion of the cardboard blank while it is conveyed.

By way of example, when the laser beam of the first laser is to be scanned such that removal of material of the cardboard blank takes place in a first direction of the surface of the cardboard blank while the cardboard blank is being conveyed in a second direction that is perpendicular to the first direction, the spot and thus the laser beam must be moved in the first direction and, simultaneously, in the second direction (thereby compensating for the conveyance of the cardboard blank) so that, relative to the surface of the cardboard blank, the material is in fact removed only in the first direction.

The conveying may, in some cases, speed up the processing of the cardboard owing to the overall movement of the laser spot relative to the surface of the cardboard blank. The laser spot moves with respect to a position of the surface due to the scanning (with the scanner) and the movement of the cardboard blank due to the conveying.

In some embodiments, the cardboard blank is conveyed at a speed greater than or equal to 50 mm/s and less than or equal to 5000 mm/s. In some embodiments, the speed at which the cardboard blank is conveyed is greater than or equal to 500 mm/s and/or 1000 mm/s. In some embodiments, the speed at which the cardboard blank is conveyed is less than or equal to at least one of: 2500 mm/s, 1000 mm/s, and 500 mm/s. In some embodiments, the speed at which the cardboard blank is conveyed is changed during irradiation of the surface of the cardboard blank with the first laser in order to remove material from the cardboard blank according to the first pattern.

In some embodiments, the cardboard blank is conveyed at a speed greater than or equal to −5000 mm/s and less than or equal to 5000 mm/s. In some embodiments, the speed at which the cardboard blank is conveyed is greater than or equal to −2500 mm/s and/or −1000 mm/s. In some embodiments, the speed at which the cardboard blank is conveyed is less than or equal to 2500 mm/s and/or 1000 mm/s. In some embodiments, the speed at which the cardboard blank is conveyed is changed during irradiation of the surface of the cardboard blank with the first laser in order to remove material from the cardboard blank according to the first pattern.

The cardboard blank may be successively conveyed in a first direction and in a second direction that is opposite to the first direction, that is to say, the cardboard blank may be conveyed forwards and backwards (as denoted with the negative speeds that indicate that the speed corresponds to the opposite direction), in some cases also while the cardboard blank is irradiated. In this sense, while irradiation of the cardboard blank takes place, the cardboard blank may be conveyed successively in the two directions (one, two or more successions of alternating conveying directions) and be stopped at some time instants (for example when changing the conveying direction, or during irradiation of one or more portions of the cardboard blank).

The speed at which the cardboard blank is conveyed may be changed such that the conveying direction is changed or is not changed (i.e. speeding up or slowing down the conveyance in the same direction that the cardboard blank is being conveyed). In addition to the scanning of the laser beam with a scanner, with the change in conveying speed the laser beam is also aimed at one position or another of the cardboard blank. This, in turn, may be used for reducing the rotation speeds of the mirrors of the scanner since the movement of the conveyor results in a different speed at which the laser beam is moved throughout the surface of the cardboard blank. Further, the change in conveying speed may also be used for speeding up the processing of the cardboard blank since, for same rotation speeds of the mirrors of the scanner, the movement of the conveyor may result in a greater speed at which the laser beam is moved throughout the surface of the cardboard blank.

The conveying speed is changed taking into account how the laser beam is scanned or is to be scanned so that the irradiation for removing material from the cardboard blank according to the corresponding pattern may be effected.

In some embodiments, a first scanner scans the laser beam of the first laser with the first scanning speed.

In some embodiments, the method further comprises:
irradiating the surface of the cardboard blank with the first laser in order to remove material from the cardboard blank according to a second pattern, the first laser irradiating with a second laser power and with the laser beam thereof being scanned with a second scanning speed;
the second laser power is greater than or equal to 0.5 kW; and the second scanning speed is greater than or equal to 500 mm/s and less than or equal to 10000 mm/s.

The first laser irradiates the cardboard blank with the second laser power and with its laser beam being scanned with the second scanning speed thereby removing material from the cardboard blank according to the second pattern in order to cut the cardboard blank. To this end, the first laser may burn all the plies of the cardboard blank in the portion of the cardboard blank that is irradiated, and does so according to said second pattern.

The processing of cardboard with both irradiation steps (which provide fold lines and cuts) is particularly suitable for manufacturing foldable products (e.g. cardboard containers) out of the cardboard blank as the outer shape of such products may correspond to the second pattern. Generally, portions of cardboard blanks produce final products, and thus traditionally they have been cut out therefrom with dies featuring the shape of the products.

The use of a laser (rather than dies) to cut portions of cardboard blanks eases the processing of cardboard as no dies need to be manufactured. This means that manufacturing products made of cardboard may be carried out even for small batches by adjusting the second pattern with which the first laser is to irradiate the surface of the cardboard blank.

The amount of energy that needs to be deposited on the cardboard blank to cut the cardboard blank is greater than the amount of energy deposited for providing fold lines. To this end, the laser scanning speeds are lower than that for providing fold lines in those cases in which the same laser power is used. A laser scanning speed ranging from 500 mm/s to 10000 mm/s provides a good trade-off between processing time and quality of the resulting cardboard blank in terms of crisp edges and lack of burned contours, particularly in the surface of the cardboard blank corresponding to the second pattern and/or the surface adjacent thereto.

In some examples in which the cardboard blank is thick (e.g. thickness of 1 cm or larger, such as 2 cm, 3 cm, 5 cm, etc.), the irradiation of the first laser with the second laser power and with its laser beam being scanned with the second scanning speed may remove a portion of the material in the cardboard blank, thereby providing fold lines instead of cutting it. As the second laser power becomes greater and/or the second scanning speed becomes lower, more energy is deposited on the cardboard blank thereby removing more material from the cardboard blank so as to cut it.

In some embodiments, the second pattern comprises a plurality of segments. In some of these embodiments, the segments of the plurality of segments are one of: continuous lines, discontinuous lines, and a combination thereof.

When the segments are continuous, the removal of material results in a complete cut of the cardboard. When the segments are discontinuous, a user may manually break or cut the cardboard along the segments, for example.

In some embodiments, the first scanner scans the laser beam of the first laser with the second scanning speed.

In some embodiments, the second laser power is equal to the first laser power.

In some embodiments, the second laser power is greater than or equal to 1.0 kW and/or 2.0 kW. In some embodiments, the second laser power is less than or equal to at least one of: 10.0 kW, 5.0 kW, 3.0 kW, and 2.0 kW.

In some embodiments, the second scanning speed is greater than or equal to 1500 mm/s and/or 3000 mm/s. In some embodiments, the second scanning speed is less than or equal to at least one of: 7500 mm/s, 5000 mm/s, 2500 mm/s, 2000 mm/s, 1500 mm/s, and 1000 mm/s.

In some embodiments, first and second scanners sequentially scan the laser beam of the first laser with the first scanning speed. In some embodiments, the first and the second scanners sequentially scan the laser beam of the first laser with the second scanning speed.

The first laser may have its laser beam scanned with two different scanners by means of a beam switch with which it is possible to selectively provide the laser beam to one of the two scanners at a time. By operating the beam switch, the laser beam is sequentially scanned with the first and the second scanners.

The use of two scanners increases a coverage area of the first laser because the first scanner may scan the laser beam of the first laser in a first portion of the surface of the cardboard blank and the second scanner may scan the laser beam in a second portion of the surface of the cardboard blank.

In some embodiments, the surface of the cardboard blank irradiated with the first laser to remove material from the cardboard blank according to the second pattern is irradiated with the first laser a single time. That is, material may be removed from the cardboard blank according to the second pattern with a single pass of the laser irradiating the surface thereof.

In some embodiments, the surface of the cardboard blank irradiated with the first laser to remove material from the cardboard blank according to the second pattern is irradiated with the first laser a plurality of times.

In some embodiments, the step of irradiating the surface of the cardboard blank with the first laser in order to remove material from the cardboard blank according to the second pattern is carried out while the cardboard blank is being conveyed.

In some embodiments, the cardboard blank is conveyed at a speed greater than or equal to 50 mm/s and less than or equal to 5000 mm/s. In some embodiments, the speed at which the cardboard blank is conveyed is greater than or equal to 500 mm/s and/or 1000 mm/s. In some embodiments, the speed at which the cardboard blank is conveyed is less than or equal to at least one of: 2500 mm/s, 1000 mm/s, and 500 mm/s. In some embodiments, the speed at which the cardboard blank is conveyed is changed during irradiation of the surface of the cardboard blank with the first laser in order to remove material from the cardboard blank according to the second pattern.

In some embodiments, the cardboard blank is conveyed at a speed greater than or equal to −5000 mm/s and less than or equal to 5000 mm/s. In some embodiments, the speed at which the cardboard blank is conveyed is greater than or equal to −2500 mm/s and/or −1000 mm/s. In some embodiments, the speed at which the cardboard blank is conveyed is less than or equal to 2500 mm/s and/or 1000 mm/s. In some embodiments, the speed at which the cardboard blank is conveyed is changed during irradiation of the surface of the cardboard blank with the first laser in order to remove material from the cardboard blank according to the second pattern.

In some embodiments, the step of irradiating the surface of the cardboard blank with the first laser in order to remove material from the cardboard blank according to the second pattern is carried out after the step of irradiating the surface of the cardboard blank with the first laser in order to remove material from the cardboard blank according to the first pattern.

The precision with which the fold lines are formed is greater when the surface of the cardboard blank is first irradiated with the first laser, with the first laser power and with its laser beam being scanned with the first scanning speed. This is so because the surface of the cardboard blank irradiated is less likely to move. If the cardboard blank were first irradiated with the first laser with the second laser power and with its laser beam being scanned with the second scanning speed, a portion of the cardboard blank would then have some play owing to the cuts that may be provided. Afterwards, if the portion were irradiated with the first laser with the first laser power and with its laser beam being scanned with the first scanning speed, the portion could slightly move while being irradiated. This problem is more likely to occur if the second pattern is a continuous closed shape because after the cardboard blank is subject to the cutting, two pieces result from the cardboard blank. Even if one of the pieces is within the other, relative motion between the two may exist when the cardboard blank is subject to further irradiation for providing fold lines.

In some embodiments, the first scanning speed and/or the first laser power are/is changed during irradiation of the surface of the cardboard blank with the first laser in order to remove material from the cardboard blank according to the first pattern.

In some embodiments, the second scanning speed and/or the second laser power are/is changed during irradiation of the surface of the cardboard blank with the first laser in order to remove material from the cardboard blank according to the second pattern.

The irradiation or irradiations of the cardboard blank may be carried out such that the scanning speed(s) and/or the laser power(s) are/is changed while removing material according to the corresponding pattern. For example, material from the cardboard blank is removed so as to provide a first segment of the first pattern while irradiating with a first laser power of 0.5 kW and a first scanning speed of 2000 mm/s, a second segment of the first pattern while irradiating with a first laser power of 0.5 kW and a first scanning speed of 2400 mm/s, and a third segment of the first pattern while irradiating with a first laser power of 0.85 kW and a first scanning speed of 3700 mm/s. In this sense, the laser power of the first laser may be changed depending on at least one of: the scanning speed of the laser beam thereof; the type of processing that the cardboard blank is being subject to (e.g. providing fold lines, providing engravings, and/or cutting); the conveying speed of the cardboard blank; and the movement of the scanner coupled to the first laser. Similarly, the scanning speed of the laser beam of the first laser may be changed depending on at least one of: the laser power of the first laser; the type of processing that the cardboard blank is being subject to; the conveying speed of the cardboard blank; and the movement of the scanner coupled to the first laser.

Preferably, but without limitation, material is removed from the cardboard blank such that entire segments of a pattern are formed by irradiating with laser while maintaining a same laser power and a same scanning speed, and the laser power and/or the scanning speed are/is only changed when a different segment is to be formed.

In some embodiments, a spot of the laser beam of the first laser at the surface of the cardboard blank comprises a diameter greater than or equal to 0.10 mm and less than or equal to 2.00 mm. In some of these embodiments, the diameter is greater than or equal to 0.10 mm and less than or equal to 1.00 mm, and in some cases greater than or equal to 0.20 mm and less than or equal to 0.80 mm. In some embodiments, the diameter of the spot of the laser beam of the first laser is approximately equal to one of: 0.25 mm, 0.40 mm, 0.50 mm, 0.70 mm, 1.00 mm, and 1.50 mm.

The size of the spot affects the velocity at which the plies of the cardboard are burned upon irradiation. The amount of energy that the first laser deposits may be constant even if the size of the spot is modified, but the energy is spread over the entire surface of the spot, so a bigger spot makes that less energy is deposited in each portion of the spot.

Focusing the amount of energy deposited on a small spot with the laser beam being scanned with a fast scanning speed reduces collateral burning because no sufficient energy spreads out to surfaces adjacent to the spot. Accordingly, having a spot with a diameter within the aforementioned range speeds up processing of cardboard (providing fold lines and cuts) and lowers the risk that the cardboard blank may get damaged owing to accidental burning.

In some embodiments, a radiation of the first laser comprises a wavelength between 1.00 µm and 11.00 µm. In some of these embodiments, the wavelength of the radiation of the first laser is: between 1.06 µm and 1.07 µm (the endpoints being included), and is preferably 1.064 µm; or between 10.5 µm and 10.7 µm (the endpoints being included), and is preferably 10.6 µm. In some of these embodiments, the wavelength of the radiation of the first laser is between 2.0 µm and 6.0 µm.

In some embodiments, the first laser is a Nd:YAG laser. In some embodiments, the first laser is a $CO_2$ laser.

In some embodiments, the method further comprises irradiating the surface of the cardboard blank with a second laser in order to remove material from the cardboard blank. In these embodiments, material may be removed from the cardboard blank according to the first pattern, the second pattern, or a third pattern. Further, the second laser may irradiate with the first laser power and with its laser beam being scanned with the first scanning speed. The second laser may also irradiate with the second laser power and with its laser beam being scanned with the second scanning speed.

In some embodiments, a second scanner scans the laser beam of the second laser with the first scanning speed. In some embodiments, the second scanner scans the laser beam of the second laser with the second scanning speed.

In some embodiments, the method further comprises moving the first scanner in one direction or in two perpendicular directions. In some embodiments, the method further comprises moving the second scanner in one direction or in two perpendicular directions.

The first and/or the second scanner(s) may be moved, for example, with moving means such as motorized elements provided in guideways. As the scanner(s) is/are moved, so does the portion of the surface of the cardboard blank that the first laser and/or the second laser may irradiate, therefore the cardboard blanks may even remain static throughout the entire processing, and/or larger cardboard blanks be processed.

In some embodiments, at least one of the first scanning speed, the first laser power, the second scanning speed and the second laser power is changed during irradiation of the surface of the cardboard blank with the second laser in order to remove material from the cardboard blank according to one of the first, the second and the third patterns.

In some cases, the second laser may irradiate the surface of the cardboard blank cooperatively with the first laser. In a first example, the second laser may provide the cardboard blank with fold lines according to a pattern that complement fold lines provided in the cardboard blank resulting from the irradiation with the first laser, or cut the cardboard blank according to a pattern thereby complementing cuts provided in the cardboard blank resulting from the irradiation with the first laser. In a second example, the second laser may cut the cardboard blank according to a pattern and the first laser may provide the cardboard blank with fold lines according to another pattern. In a third example, the second laser may provide the cardboard blank with fold lines according to a pattern and the first laser may cut the cardboard blank according to another pattern.

In some cases, the first laser may irradiate the surface of the cardboard blank so as to cut it in a first portion of the cardboard blank and/or provide fold lines in the first portion, and the second laser may irradiate the surface of the cardboard blank so as to cut it in a second portion of the cardboard blank and/or provide fold lines in the second portion. Therefore, the cardboard may be subject to double processing at the same time (one processing per laser); the processing may be the same (e.g. the processing in the first portion and in the second portion each produces a cardboard container with same shape and fold lines) or different.

The method may further comprise changing the laser power of the second laser depending on at least one of: the scanning speed of the laser beam thereof; the type of processing that the cardboard blank is being subject to (e.g. providing fold lines, providing engravings, and/or cutting); the conveying speed of the cardboard blank; and the movement of the scanner coupled to the second laser. The method may further comprise changing the scanning speed of the laser beam of the second laser depending on at least one of: the laser power of the second laser; the type of processing that the cardboard blank is being subject to; the conveying speed of the cardboard blank; and the movement of the scanner coupled to the second laser.

In some embodiments, the step of irradiating the surface of the cardboard blank with the second laser in order to remove material from the cardboard blank according to the first pattern, the second pattern, or the third pattern is carried out while the cardboard blank is being conveyed.

In some embodiments, the cardboard blank is conveyed at a speed greater than or equal to 50 mm/s and less than or equal to 5000 mm/s. In some embodiments, the speed at which the cardboard blank is conveyed is greater than or equal to 500 mm/s and/or 1000 mm/s. In some embodiments, the speed at which the cardboard blank is conveyed is less than or equal to at least one of: 2500 mm/s, 1000 mm/s, and 500 mm/s. In some embodiments, the speed at which the cardboard blank is conveyed is changed during irradiation of the surface of the cardboard blank with the second laser in order to remove material from the cardboard blank according to the first pattern, the second pattern, or the third pattern.

In some embodiments, the cardboard blank is conveyed at a speed greater than or equal to −5000 mm/s and less than or equal to 5000 mm/s. In some embodiments, the speed at which the cardboard blank is conveyed is greater than or equal to −2500 mm/s and/or −1000 mm/s. In some embodiments, the speed at which the cardboard blank is conveyed is less than or equal to 2500 mm/s and/or 1000 mm/s. In some embodiments, the speed at which the cardboard blank is conveyed is changed during irradiation of the surface of the cardboard blank with the second laser in order to remove material from the cardboard blank according to the first pattern, the second pattern, or the third pattern.

In some embodiments, a spot of the laser beam of the second laser at the surface of the cardboard blank comprises a diameter greater than or equal to 0.10 mm and less than or equal to 2.00 mm. In some of these embodiments, the diameter is greater than or equal to 0.10 mm and less than or equal to 1.00 mm, more preferably is greater than or equal to 0.20 mm and less than or equal to 0.80 mm. In some embodiments, the diameter of the spot of the laser beam of the second laser is approximately equal to one of: 0.25 mm, 0.40 mm, 0.50 mm, 0.70 mm, 1.00 mm, and 1.50 mm.

In some embodiments, a radiation of the second laser comprises a wavelength between 1.00 µm and 11.00 µm. In some of these embodiments, the wavelength of the radiation of the second laser is: between 1.06 µm and 1.07 µm (the endpoints being included), and is preferably 1.064 µm; or between 10.5 µm and 10.7 µm (the endpoints being included), and is preferably 10.6 µm. In some of these embodiments, the wavelength of the radiation of the second laser is between 2.0 µm and 6.0 µm.

In some embodiments, the second laser is a Nd:YAG laser. In some embodiments, the second laser is a $CO_2$ laser.

In some embodiments, the method further comprises absorbing air from below the cardboard blank and/or blowing air from above the cardboard blank while carrying out at least one of the following steps:

irradiating the surface of the cardboard blank with the first laser in order to remove material from the cardboard blank according to the first pattern and/or the second pattern; and irradiating the surface of the cardboard blank with the second laser in order to remove material from the cardboard blank according to the first pattern and/or the second pattern.

In these embodiments, the first laser and/or the second laser irradiate(s) the surface of the cardboard blank from above of the cardboard blank.

The absorption of air from below and/or the blowing of air from above may reduce the amount of smoke that is present close to the cardboard blank upon irradiating the same with the first laser and/or the second laser. The smoke generated during irradiation may get the laser(s) and/or the scanner(s) dirty, or even have particles therein irradiated with the laser(s) thereby reducing efficiency in the cardboard processing and quality of the processed cardboard due to less energy being deposited on the surface of the cardboard blank.

In some embodiments, the surface of the cardboard blank is an inner surface thereof.

Cardboard blanks have, in most cases, a first surface or face with better quality than a second surface or face that is opposite to the first surface or face. When cardboard blanks are used as containers, commonly the first surface or face is regarded as the outer surface for quality reasons, thus any decoration printing that it is to be applied to the cardboard blank is applied to the outer surface. Since the second surface or face is poorer in terms of quality, it is regarded as the inner surface as it will not be seen until the container is open. In this sense, the inner surface is the one that is in contact with any materials or products that the container is to contain.

By irradiating the inner surface of the cardboard blank, the outer surface is less prone to damages and breaks when the cardboard blank is manipulated (e.g. carried, folded, etc.).

In some embodiments, the cardboard blank comprises a first planar ply. In some of these embodiments, the cardboard blank further comprises a second corrugated ply attached to the first planar ply. In some of these embodiments, the cardboard blank further comprises a third planar ply attached to the second corrugated ply. In some of these embodiments, the cardboard blank further comprises a fourth corrugated ply attached to the third planar ply, and a fifth planar ply attached to the fourth corrugated ply. In some of these embodiments, the cardboard blank further comprises a sixth corrugated ply attached to the fifth planar ply, and a seventh planar ply attached to the sixth corrugated ply.

A second aspect of the present disclosure relates to an apparatus for removing material from a cardboard blank, comprising:
- a first laser;
- a first scanner configured to scan a laser beam of the first laser;
- a support for cardboard blanks; and
- a unit programmed to operate the first laser and the first scanner such that the first laser radiates with a first laser power while scanning, according to a first pattern, the laser beam of the first laser with a first scanning speed;
- the first laser power is greater than or equal to 0.5 kW; and
- the first scanning speed is greater than or equal to 2000 mm/s and less than or equal to 25000 mm/s, and the first scanning speed is a speed at which a spot of the laser beam moves with respect to a plane of the support.

The apparatus may form fold lines on a cardboard blank according to the first pattern as the laser beam of the first laser is scanned. To this end, the unit operates the scanner such that the laser beam follows a trajectory (particularly a spot of the laser beam on the plane of the support) comprising the first pattern, and does so by rotating the mirrors of the first scanner in such a way that the spot moves with the first scanning speed. Also, the unit operates the first laser such that, upon following the trajectory with the scanner, the first laser is selectively enabled and disabled based on the first pattern. By way of example, the first pattern may include a plurality of lines and/or shapes in general that are spaced apart one to another, so keeping the first laser enabled while following the trajectory would result in the irradiation of portions of the surface of a cardboard blank other than those corresponding to the first pattern.

The first laser and the first scanner are provided such that the first laser radiates towards the support owing to the first scanner, which aims the laser beam at the support and scans it so as to follow the trajectory on the support (where cardboard blanks will rest).

The combination of the first laser power and the first scanning speed is such that, in many examples, the apparatus makes possible to remove at least a portion of a ply (including one or some plies) of material from a cardboard blank (the portions of the cardboard blank irradiated with the first laser) in a single pass of the first laser, accordingly fold lines may be provided by irradiating a cardboard blank with the first laser.

The unit may be, for instance, an FPGA programmed to operate the first laser and the first scanner.

The plane of the support is preferably a plane that comprises a part or a surface of the support on which cardboard blanks may rest when they are to be processed with the apparatus, namely a supporting plane.

In some embodiments, the first laser power is greater than or equal to 1.0 kW and/or 2.0 kW. In some embodiments, the first laser power is less than or equal to at least one of: 10.0 kW, 5.0 kW, 3.0 kW, and 2.0 kW.

In some embodiments, the first scanning speed is greater than or equal to 5000 mm/s and/or 7500 mm/s. In some embodiments, the first scanning speed is less than or equal to at least one of: 15000 mm/s, 10000 mm/s, 7500 mm/s, and 5000 mm/s.

In some embodiments, the unit is programmed to operate the first laser and the first scanner such that the first laser radiates with the first laser power while scanning, according to a first pattern, the laser beam of the first laser a single time with the first scanning speed. That is, material may be removed from a cardboard blank according to the first pattern with a single pass of the laser irradiating the surface thereof.

In some embodiments, the unit is programmed to operate the first laser and the first scanner such that the first laser radiates with the first laser power while scanning, according to the first pattern, the laser beam of the first laser a plurality of times with the first scanning speed.

In some embodiments, the first pattern comprises a plurality of segments. In some of these embodiments, the segments of the plurality of segments are one of: continuous lines, discontinuous lines, and a combination thereof.

In some of these embodiments, at least two segments of the plurality of segments are parallel. In some of these embodiments, a separation of the at least two segments is less than a diameter of a spot of the laser beam of the first laser, and greater than 50% of the diameter of the spot of the laser beam of the first laser, the separation being measured from a central axis of one segment to a central axis to the other segment, each central axis extending along a length of the segment thereof.

In some embodiments, the unit is further programmed to operate the first laser and the first scanner such that the first laser radiates with a second laser power while scanning, according to a second pattern, the laser beam of the first laser with a second scanning speed;
- the second laser power is greater than or equal to 0.5 kW; and
- the second scanning speed is greater than or equal to 500 mm/s and less than or equal to 10000 mm/s, and the second scanning speed is the speed at which the spot of the laser beam moves with respect to the plane of the support.

The apparatus makes possible to cut a cardboard blank according to the second pattern as the laser beam of the first laser is scanned. To this end, the unit operates the scanner such that the laser beam follows a trajectory (particularly the spot of the laser beam on the support) comprising the second pattern, and does so by rotating the mirrors of the first scanner in such a way that the spot moves with the second scanning speed. Also, the unit operates the first laser such that, upon following the trajectory with the first scanner, the first laser is selectively enabled and disabled based on the second pattern. By way of example, the second pattern may include a plurality of lines and/or shapes in general that are spaced apart one to another, so keeping the first laser enabled while following the trajectory would result in the irradiation of portions of the surface of a cardboard blank other than those corresponding to the second pattern.

The combination of the second laser power and the second scanning speed is such that the apparatus makes possible to remove all plies of material from the cardboard blank (the portions thereof irradiated with the first laser) in a single pass of the first laser, accordingly cuts may be provided by irradiating a cardboard blank with the first laser.

In some examples in which the cardboard blank from which material is to be removed with the apparatus is thick (e.g. thickness of 1 cm or larger, such as 2 cm, 3 cm, 5 cm, etc.), the radiation of the first laser with the second laser power and with its laser beam being scanned with the second scanning speed may remove a portion of the material in the cardboard blank, thereby providing fold lines instead of cutting it. As the second laser power becomes greater and/or the second scanning speed becomes lower, more energy may be deposited on the cardboard blank thereby removing more material from the cardboard blank so as to cut it.

In some embodiments, the second laser power is equal to the first laser power.

In some embodiments, the second laser power is greater than or equal to 1.0 kW and/or 2.0 kW. In some embodiments, the second laser power is less than or equal to at least one of: 10.0 kW, 5.0 kW, 3.0 kW, and 2.0 kW.

In some embodiments, the second scanning speed is greater than or equal to 1500 mm/s and/or 3000 mm/s. In some embodiments, the second scanning speed is less than or equal to at least one of: 7500 mm/s, 5000 mm/s, 2500 mm/s, 2000 mm/s, 1500 mm/s, and 1000 mm/s.

In some embodiments, the unit is further programmed to operate the first laser and the first scanner such that the first laser radiates with the second laser power while scanning, according to the second pattern, the laser beam of the first laser a single time with a second scanning speed. That is, material may be removed from a cardboard blank according to the second pattern with a single pass of the laser irradiating the surface thereof.

In some embodiments, the unit is further programmed to operate the first laser and the first scanner such that the first laser radiates with the second laser power while scanning, according to the second pattern, the laser beam of the first laser a plurality of times with a second scanning speed.

In some embodiments, the second pattern comprises a plurality of segments. In some of these embodiments, the segments of the plurality of segments are one of: continuous lines, discontinuous lines, and a combination thereof.

In some embodiments, the unit is further programmed to operate the first laser and the first scanner such that radiation of the first laser while scanning the laser beam thereof according to the second pattern is carried out after radiation of the first laser while scanning the laser beam thereof according to the first pattern.

In some embodiments, the apparatus further comprises moving means configured to move the first scanner. Also, the unit is further programmed to operate the moving means for moving the first scanner.

The moving means may comprise one or two displaceable units that move the first scanner in one direction, or in two perpendicular directions. By moving the first scanner, larger cardboard blanks may be processed with the same apparatus since the area within which the first laser may radiate towards a cardboard blank is otherwise limited to the area that may be scanned with the first scanner (remaining static). In addition, by moving the first scanner, the apparatus is adjusted so as to process differently sized cardboard blanks; for example, if a batch of first cardboard blanks with a first size must have material removed therefrom, the moving means may move the first scanner to a first position at which the first scanner scans the laser beam of the first laser for radiating at first cardboard blanks, and if a batch of second cardboard blanks with a second size must then have material removed therefrom, the moving means may move the first scanner to a second position at which the first scanner scans the laser beam of the first laser for radiating at second cardboard blanks.

In some examples, when the moving means move the first scanner to a particular position (from which the laser beam of the first laser will be scanned), the unit loads a calibration of the first scanner for the particular position, and then radiation at cardboard (on the support) may take place.

In some of these examples and in some other examples, the unit may dynamically adjust the calibration of the first scanner as the first scanner is moved with the moving means, therefore the laser may radiate while the first scanner is in movement. When the beam of the first laser is to follow a trajectory according to the first pattern or the second pattern, the overall trajectory of the beam results in the superposition of: the movement of the scanner with the moving means (which displaces the beam accordingly), which are of low speed but make possible to cover a large area, and the movement of the beam based on the scanning by the scanner (i.e. rotation of the mirrors thereof), which is of high speed yet has a limited coverage.

In this regard, in some examples the unit is further programmed to operate the first laser, the first scanner and the moving means such that: radiation with the first laser with the first laser power is carried out while scanning, according to the first pattern, the laser beam of the first laser with the first scanning speed and while moving the first scanner with the moving means; and/or radiation with the first laser with the second laser power is carried out while scanning, according to the second pattern, the laser beam of the first laser with the second scanning speed and while moving the first scanner with the moving means. In some other examples, a programmable logic controller, i.e. PLC, operates the moving means whereas the unit is programmed to operate the first laser and the first scanner; the unit receives data from the moving means regarding the position and/or the speed thereof.

In some embodiments, the apparatus further comprises a second scanner configured to scan the laser beam of the first laser, and a beam switch. Also, the unit is further programmed to operate the first laser, the first scanner and the second scanner such that the laser beam of the first laser is sequentially scanned with the first and the second scanners so that the first laser radiates while the laser beam thereof is sequentially scanned with the first and the second scanners. To this end, the unit is further programmed to operate the beam switch so as to sequentially scan the laser beam of the first laser with the first and the second scanners.

The second scanner is provided such that the first laser radiates towards the support owing to the second scanner, which aims the laser beam at the support and scans it so as to follow the trajectory on the support.

By sequentially scanning the laser beam with the first and the second scanners, the first laser may radiate so as to remove material from larger cardboard blanks since the coverage area of the first laser is greater. In this sense, when the laser beam of the first laser is scanned with the first scanner, the first laser may radiate at a cardboard blank (on the support) within a first coverage area, and when the laser beam of the first laser is scanned with the second scanner, the first laser may radiate at the cardboard blank within a second coverage area. The unit sequentially switches between the two scanners so as to radiate with the first laser within the first coverage area (with the first scanner) and the second coverage area (with the second scanner).

When different areas are to be covered with the first laser, for a same cardboard blank and overall processing, the use of two scanners may result in shorter processing times than those achieved with moving means for moving the first scanner. The processing times are shorter because radiation at the cardboard blank involves sequentially providing the laser beam to one scanner and rotating the mirrors thereof, whereas the moving means involve mechanically moving one or more elements that move the first scanner, said movement being slower than rotating the mirrors of the scanners.

In some embodiments, the moving means are further configured to move the second scanner. Also, the unit is further programmed to operate the moving means for moving the second scanner.

In addition to the provision of a second coverage area within which the first laser may radiate at a cardboard blank (owing to the second scanner coupled to the first laser), the first and the second coverage areas may be displaceable so that processing entire cardboard blanks may not entail moving the cardboard blanks. One or both of the first and the second scanners may be moved, thereby moving the first and/or the second coverage areas throughout the support (and thus the surface of a cardboard blank). Sequentially scanning the laser beam of the first laser with the first and the second scanners makes possible to radiate at the cardboard blank throughout its entire surface.

In some examples, when the moving means move the second scanner to a particular position (from which the laser beam of the first laser will be scanned), the unit loads a calibration of the second scanner for the particular position, and then radiation at cardboard may take place.

In some of these examples and in some other examples, the unit may dynamically adjust the calibration of the second scanner as the second scanner is moved with the moving means, therefore the laser may radiate while the second scanner is in movement.

In some embodiments, the apparatus further comprises:
a second laser; and
a second scanner configured to scan a laser beam of the second laser.

In some of these embodiments, the unit is further programmed to operate the second laser and the second scanner such that the second laser radiates with a laser power such as, for example, the first laser power while the laser beam thereof is scanned with the first scanning speed; and/or with the second laser power while the laser beam thereof is scanned with the second scanning speed. Further, the unit may also operate the second laser such that the laser beam thereof is scanned according to the first pattern, the second pattern, or a third pattern.

In some other embodiments, the apparatus further comprises a (second) unit programmed to operate the second laser and the second scanner such that the second laser radiates with a laser power such as, for example, the first laser power while the laser beam thereof is scanned with the first scanning speed; and/or with the second laser power while the laser beam thereof is scanned with the second scanning speed. Further, the (second) unit may also operate the second laser such that the laser beam thereof is scanned according to the first pattern, the second pattern, or a third pattern.

With the provision of two units (first and second units), each unit may control one single laser and one single scanner thereby simplifying the operation of the unit. Accordingly, each unit may have less processing power than if a single unit were to control both lasers and both scanners.

The second laser and the second scanner are provided such that the second laser radiates towards the support owing to the second scanner, which aims the laser beam at the support and scans it so as to follow the trajectory on the support.

In some embodiments, the moving means are further configured to move the second scanner that scans the second laser.

In some embodiments, the support comprises a plurality of spaced apart metallic plates for supporting cardboard blanks.

The metallic plates are preferably arranged such that they are parallel to the laser beam of each laser of the apparatus when the laser beam is provided in perpendicular to the cardboard (that is, perpendicular to the supporting plane). Even though when the laser beam is scanned an angle between the laser beam and the metallic plates (e.g. 10° or less) may exist, with this arrangement the beam of the first and/or the second laser(s) go(es) in a direction substantially parallel to the spaced apart metallic plates. Accordingly, the surface of the metallic plates that may be radiated at with the first and/or the second laser(s) is reduced.

The side of the metallic plates that is 'visible' to the first and/or the second laser(s) (i.e. the side closest to the scanner) is the side corresponding to the thickness of the metallic plates. Therefore, if the laser beam passes through the cardboard blank, it is less likely that it will reach a metallic plate, and thus the cardboard blank is not radiated at from the other side thereof. Said side of the metallic plates may comprise a saw geometry; the saw-shaped side reduces the probability that a laser beam reaching said side of the metallic plates will reflect upwards towards the first and/or the second laser(s), the scanner, or the unit. If the laser beam arrives at the side of a metallic plate, its reflection will depend upon the portion of the saw geometry irradiated by the laser beam.

In some embodiments, the support is a conveyor comprising at least two motorized axles, and a plurality of spaced apart metallic plates for conveying and supporting cardboard blanks, the plurality of spaced apart metallic plates being coupled to the at least two motorized axles.

The conveyor may be controlled with a programmable logic controller (i.e. a PLC) that the apparatus comprises. The conveyor may comprise, for example, two or more motorized axles with chains coupled thereto for moving a plurality of spaced apart metallic plates, which are repeatedly cycled. The conveyor is similar to a conveyor belt, but instead of rotating a continuous belt about the motorized axles, they rotate the plurality of metallic plates.

The plurality of metallic plates supports and conveys cardboard blanks. The metallic plates are preferably arranged such that a subset thereof located on the upper part of the conveyor is parallel to the laser beam of each laser of the apparatus when the laser beam is provided in perpendicular to the cardboard. Even though an angle between the laser beam and the metallic plates on said upper part of the conveyor may exist (e.g. 10° or less) when the laser beam is scanned, with this arrangement, the beam of the first and/or the second laser(s) go(es) in a direction parallel to the spaced apart metallic plates. Accordingly, the surface of the metallic plates that may be radiated at with the first and/or the second laser(s) (i.e. the side closest to the scanner) is reduced.

The side of the metallic plates (that is on the upper part) that is 'visible' to the first and/or the second laser(s) (i.e. the side closest to the scanner) is the side corresponding to the thickness of the metallic plates. Therefore, if the laser beam passes through the cardboard blank, it is less likely that it will reach a metallic plate, and thus the cardboard blank is not radiated at from the other side thereof. Said side of the metallic plates may comprise a saw geometry; the saw-shaped side reduces the probability that a laser beam reaching said side of the metallic plates will reflect upwards towards the first and/or the second laser(s), the scanner, or the unit. If the laser beam arrives at the side of a metallic plate, its reflection will depend upon the portion of the saw geometry irradiated by the laser beam.

In some embodiments, the unit is further programmed to operate the first and/or the second scanner(s) and the first and/or the second laser(s) such that radiation while scanning the beam(s) thereof are/is adjusted based on speed of the conveyor. In some embodiments, the unit is further programmed to operate the first and/or the second scanner(s)

and the first and/or the second laser(s) such that radiation while scanning the beam(s) thereof are/is adjusted so as to compensate for speed of the conveyor. In these embodiments, the conveyor further comprises an encoder for providing data relative to an operation of the conveyor (e.g. position and velocity thereof), and means for detecting a piece (e.g. an infrared photoelectric cell) for providing data relative to a position of a cardboard blank on the conveyor.

The unit receives the data from the encoder and the means for detecting the piece and adjusts the scanning trajectory or trajectories of the laser(s) by taking into account the conveying speed and the location of the cardboard blank relative to the conveyor, and thus, relative to the scanner(s).

In some embodiments, the unit is further programmed to change the speed of the conveyor. The speed of the conveyor may be changed while the first laser or the second laser radiates and the laser beam thereof is scanned according to the first pattern, the second pattern, or the third pattern.

In some embodiments, the conveyor is configured to convey at a speed greater than or equal to 50 mm/s and less than or equal to 5000 mm/s. In some embodiments, the speed of the conveyor is greater than or equal to 500 mm/s and/or 1000 mm/s. In some embodiments, the speed of the conveyor is less than or equal to at least one of: 2500 mm/s, 1000 mm/s, and 500 mm/s. In some embodiments, the unit changes the speed of the conveyor, preferably to a speed within any of these speed ranges. In some of these embodiments, the unit does not change the speed of the conveyor to 0 mm/s or less than 50 mm/s while the laser(s) radiate(s) and the laser beam(s) thereof is/are scanned.

In some embodiments, the conveyor is configured to convey at a speed greater than or equal to −5000 mm/s and less than or equal to 5000 mm/s. In some embodiments, the speed of the conveyor is greater than or equal to −2500 mm/s and/or −1000 mm/s. In some embodiments, the speed of the conveyor is less than or equal to 2500 mm/s and/or 1000 mm/s. In some embodiments, the unit changes the speed of the conveyor, preferably to a speed within any of these speed ranges. In some of these embodiments, the unit reduces the speed of the conveyor to 0 mm/s or less than 50 mm/s while the laser(s) radiate(s) and the laser beam(s) thereof is/are scanned.

The unit may control the conveyor so that the same may be used for processing cardboard blanks with the apparatus. To this end, the unit changes the speed of the conveyor thereby making possible, for instance, that the laser beam(s) may reach different portions of the cardboard blank for removing material from the cardboard blanks, or faster processing owing to the superposed motions of the conveyor and the scanner. In some embodiments, the unit may change the conveying direction by changing the speed from a negative conveying speed to a positive conveying speed (the negative conveying speed denoting a conveyance in an opposite direction), and vice versa, and even stop the conveying for some time by reducing the speed to zero. So not only the apparatus may process cardboard blanks that are continuously conveyed at a constant or changing speed, but also cardboard blanks that are moved back and forth for radiating the same with the laser(s). In this sense, the unit adjusts the operation of the laser(s) and scanner(s) based on the speed of the conveyor.

In some embodiments, the unit is further programmed to change the first scanning speed and/or the first laser power while the first laser radiates and the laser beam thereof is scanned according to the first pattern. In some embodiments, the unit is further programmed to change the second scanning speed and/or the second laser power while the first laser radiates and the laser beam thereof is scanned according to the second pattern.

In some embodiments, the unit is further programmed to change at least one of the first scanning speed, the first laser power, the second scanning speed, and the second laser power while the second laser radiates and the laser beam thereof is scanned according to one of the first, the second and the third patterns.

The radiation with the first laser and/or the second laser may be carried out such that the scanning speed(s) and/or the laser power(s) are/is changed while following the corresponding pattern. For example, while the laser beam of the first laser is scanned such that it follows a first segment of the first pattern, the first laser power is 0.70 kW and the first scanning speed is 3200 mm/s; then, while it follows a second segment of the first pattern, the first laser power is 0.90 kW and the first scanning speed is 3500 mm/s; and then, while it follows a third segment of the first pattern, the first laser power is 1.05 kW and the first scanning speed is 4100 mm/s. In this sense, the unit may change the laser power of the first laser depending on at least one of: the scanning speed of the laser beam thereof; the type of processing that a cardboard blank is to be subject to (e.g. provide fold lines, provide engravings, and/or cut); the speed of the conveyor; and the movement of the scanner coupled to the first laser. The unit may also change the scanning speed of the laser beam of the first laser depending on at least one of: the laser power of the first laser; the type of processing that a cardboard blank is to be subject to; the speed of the conveyor; and the movement of the scanner coupled to the first laser. The unit may do similarly with regards to the second laser, that is, it may change the laser power and/or the scanning speed thereof.

In some embodiments, the first laser is operated to radiate with a spot comprising a diameter greater than or equal to 0.10 mm and less than or equal to 2.00 mm. In some of these embodiments, the diameter is greater than or equal to 0.10 mm and less than or equal to 1.00 mm, more preferably is greater than or equal to 0.20 mm and less than or equal to 0.80 mm. In some embodiments, the diameter of the spot of the first laser is approximately equal to one of: 0.25 mm, 0.40 mm, 0.50 mm, 0.70 mm, 1.00 mm, and 1.50 mm.

In some embodiments, the radiation of the first laser comprises a wavelength between 1.00 μm and 1100 μm. In some of these embodiments, the wavelength of the radiation of the first laser is: between 1.06 μm and 1.07 μm (the endpoints being included), and is preferably 1.064 μm; or between 10.5 μm and 10.7 μm (the endpoints being included), and is preferably 10.6 μm. In some of these embodiments, the wavelength of the radiation of the first laser is between 2.0 μm and 6.0 μm.

In some embodiments, the first laser is a Nd:YAG laser. In some embodiments, the first laser is a $CO_2$ laser.

In some embodiments, the second laser is operated to radiate the surface of the cardboard blank with a spot comprising a diameter greater than or equal to 0.10 mm and less than or equal to 2.00 mm. In some of these embodiments, the diameter is greater than or equal to 0.10 mm and less than or equal to 1.00 mm, more preferably is greater than or equal to 0.20 mm and less than or equal to 0.80 mm. In some embodiments, the diameter of the spot of the second laser is approximately equal to one of: 0.25 mm, 0.40 mm, 0.50 mm, 0.70 mm, 1.00 mm, and 1.50 mm.

In some embodiments, the radiation of the second laser comprises a wavelength between 1.00 μm and 11.00 μm. In some of these embodiments, the wavelength of the radiation of the second laser is: between 1.06 μm and 1.07 μm (the endpoints being included), and is preferably 1.064 µm; or between 10.5 µm and 10.7 µm (the endpoints being included), and is preferably 10.6 µm. In some of these embodiments, the wavelength of the radiation of the second laser is between 2.0 µm and 6.0 µm.

In some embodiments, the second laser is a Nd:YAG laser. In some embodiments, the second laser is a $CO_2$ laser.

In some embodiments, the apparatus further comprises air absorbing means. In some of these embodiments, the air absorbing means comprise a suction pump.

The air absorbing means are preferably provided below the support so as to absorb air from below of the support and thus pull downwards any smoke that is generated while removing material from a cardboard blank. Further, the air absorption also pulls any cardboard blank on the support against a surface of the support, for instance a surface of a plurality of spaced apart metallic plates; hence, the cardboard blank has a greater friction with respect to the surface and it is less likely that it will move while being processed by the apparatus.

In some embodiments, the apparatus further comprises air blowing means. In some of these embodiments, the air blowing means comprise a blower.

The air blowing means are preferably provided above the support. The air blowing means enhance air circulation and push downwards any smoke generated while removing material from a cardboard blank, and also push downwards the cardboard blank against the surface of the support supporting it so as to increase the friction. With the airflow provided by the air blowing means, scraps from the cardboard blank may also be pushed downwards so as to ease their collection and reduce the risk that the laser will accidentally burn them.

A third aspect of the present disclosure relates to a use of an apparatus according to the second aspect of the disclosure for removing material from a cardboard blank.

A fourth aspect of the present disclosure relates to an apparatus programmed to carry out a method according to the first aspect of the disclosure.

A fifth aspect of the present disclosure relates to an apparatus comprising means for carrying out a method according to the first aspect of the disclosure.

Similar advantages as those described for the first aspect of the disclosure may also be applicable to the second, the third, the fourth and the fifth aspects of the disclosure.

A sixth aspect of the present disclosure relates to a method for processing cardboard, comprising:
irradiating a surface of a cardboard blank with a first laser in order to provide at least one fold line according to a first pattern by removing at least a portion of a ply of a first irradiated portion of the cardboard blank; and
irradiating the surface of the cardboard blank with the first laser in order to cut the cardboard blank according to a second pattern by removing all plies of a second irradiated portion of the cardboard blank.

The method makes possible to process the cardboard blank so that a foldable product derived from it may be obtained by means of laser radiation. Upon processing, the cardboard blank may be folded along the at least one fold line, and the second irradiated portion may at least be separated from the remaining part of the cardboard blank; if the second pattern (and, thus, the second irradiated portion) is a continuous closed shape (or is a continuous open shape whose ends intersect edges of the cardboard blank), then the second irradiated portion may be completely separated from the remaining part of the cardboard blank, otherwise the second irradiated portion is cut but remains attached to the remaining part of the cardboard blank.

In some embodiments, the first laser removes the one or some plies irradiating with a first laser power and with a laser beam thereof being scanned with a first scanning speed, the first laser power being greater than or equal to 0.5 kW, and the first scanning speed being greater than or equal to 2000 mm/s and less than or equal to 25000 mm/s.

In some embodiments, the first laser removes the all plies irradiating with a second laser power and with the laser beam thereof being scanned with a second scanning speed, the second laser power being greater than or equal to 0.5 kW, and the second scanning speed being greater than or equal to 500 mm/s and less than or equal to 10000 mm/s.

In some embodiments, the step of irradiating the surface of the cardboard blank with the first laser in order to provide at least one fold line according to the first pattern removes one or some plies of the first irradiated portion of the cardboard blank.

In some embodiments, at least one of the first scanning speed and the first laser power is changed while removing the one or some plies of the first irradiated portion by irradiating with the first laser. In some embodiments, at least one of the second scanning speed and the second laser power is changed while removing the all plies of the second irradiated portion by irradiating with the first laser.

In some embodiments, the first laser power is greater than or equal to 1.0 kW and/or 2.0 kW. In some embodiments, the first laser power is less than or equal to at least one of: 10.0 kW, 5.0 kW, 3.0 kW, and 2.0 kW.

In some embodiments, the first scanning speed is greater than or equal to at least one of: 5000 mm/s and/or 7500 mm/s. In some embodiments, the first scanning speed is less than or equal to at least one of: 15000 mm/s, 10000 mm/s, 7500 mm/s, and 5000 mm/s.

In some embodiments, the second laser power is greater than or equal to 1.0 kW and/or 2.0 kW. In some embodiments, the second laser power is less than or equal to at least one of: 10.0 kW, 5.0 kW, 3.0 kW, and 2.0 kW.

In some embodiments, the second scanning speed is greater than or equal to 1500 mm/s and/or 3000 mm/s. In some embodiments, the second scanning speed is less than or equal to at least one of: 7500 mm/s, 5000 mm/s, 2500 mm/s, 2000 mm/s, 1500 mm/s, and 1000 mm/s.

In some embodiments, the method further comprises:
irradiating the surface of the cardboard blank with a second laser in order to provide at least one fold line according to a third pattern by removing at least a portion of a ply of a third irradiated portion of the cardboard blank; and
irradiating the surface of the cardboard blank with the second laser in order to cut the cardboard blank according to a fourth pattern by removing all plies of a fourth irradiated portion of the cardboard blank.

In some embodiments, the second laser removes at least the portion of the ply irradiating with the first laser power and with a laser beam thereof being scanned with the first scanning speed.

In some embodiments, the step of irradiating the surface of the cardboard blank with the second laser in order to provide at least one fold line according to the third pattern removes one or some plies of the third irradiated portion of the cardboard blank.

In some embodiments, the second laser removes the all plies irradiating with the second laser power and with the laser beam thereof being scanned with the second scanning speed.

In some embodiments, at least one of the first scanning speed and the first laser power is changed while removing the one or some plies of the third irradiated portion by irradiating with the second laser. In some embodiments, at least one of the second scanning speed and the second laser power is changed while removing the all plies of the fourth irradiated portion by irradiating with the second laser.

In some embodiments, the step of irradiating the surface of the cardboard blank with the first laser in order to provide the at least one fold line and the step of irradiating the surface of the cardboard blank with the first laser in order to cut the cardboard blank are carried out while the cardboard blank is being conveyed.

In some embodiments, the cardboard blank is conveyed at a speed greater than or equal to 50 mm/s and less than or equal to 5000 mm/s. In some embodiments, the speed at which the cardboard blank is conveyed is greater than or equal to 500 mm/s and/or 1000 mm/s.

In some embodiments, the speed at which the cardboard blank is conveyed is less than or equal to at least one of: 2500 mm/s, 1000 mm/s, and 500 mm/s. In some embodiments, the speed at which the cardboard blank is conveyed is changed during irradiation of the surface of the cardboard blank.

In some embodiments, the cardboard blank is conveyed at a speed greater than or equal to −5000 mm/s and less than or equal to 5000 mm/s. In some embodiments, the speed at which the cardboard blank is conveyed is greater than or equal to −2500 mm/s and/or −1000 mm/s. In some embodiments, the speed at which the cardboard blank is conveyed is less than or equal to 2500 mm/s and/or 1000 mm/s. In some embodiments, the speed at which the cardboard blank is conveyed is changed during irradiation of the surface of the cardboard blank.

In some embodiments, the cardboard blank comprises a first planar ply. In some of these embodiments, the cardboard blank further comprises a second corrugated ply attached to the first planar ply. In some of these embodiments, the cardboard blank further comprises a third planar ply attached to the second corrugated ply. In some of these embodiments, the cardboard blank further comprises a fourth corrugated ply attached to the third planar ply, and a fifth planar ply attached to the fourth corrugated ply. In some of these embodiments, the cardboard blank further comprises a sixth corrugated ply attached to the fifth planar ply, and a seventh planar ply attached to the sixth corrugated ply.

In some embodiments, the surface of the cardboard blank is an inner surface thereof.

A seventh aspect of the present disclosure relates to a method for manufacturing a foldable cardboard container, comprising:
providing a cardboard blank; and
processing the cardboard blank with a method according to the first aspect of the disclosure, or with a method according to the sixth aspect of the disclosure.

In some embodiments, the cardboard blank comprises a first planar ply. In some of these embodiments, the cardboard blank further comprises a second corrugated ply attached to the first planar ply. In some of these embodiments, the cardboard blank further comprises a third planar ply attached to the second corrugated ply. In some of these embodiments, the cardboard blank further comprises a fourth corrugated ply attached to the third planar ply, and a fifth planar ply attached to the fourth corrugated ply. In some of these embodiments, the cardboard blank further comprises a sixth corrugated ply attached to the fifth planar ply, and a seventh planar ply attached to the sixth corrugated ply.

In some embodiments, the method further comprises folding the cardboard blank.

Similar advantages as those described for the first and the second aspects of the disclosure may also be applicable to the sixth and the seventh aspects of the disclosure.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures:

FIGS. 7-10 show exemplary fold lines.

FIGS. 11, 12A-12B, 13A-13C show apparatuses according to embodiments.

FIGS. 14-17 diagrammatically show methods according to embodiments.

DETAILED DESCRIPTION OF THE DRAWINGS

Figure 1:
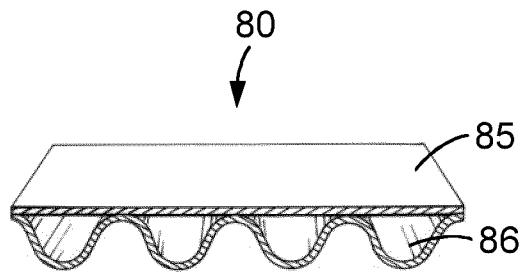
FIGS. 1-4 show exemplary types of cardboard.

FIG. 1 shows a first exemplary type of cardboard 80, commonly referred to as single face cardboard, comprising a first ply 85 that is planar, and a second ply 86 that is corrugated. The first ply 85 and the second ply 86 are joined together with an adhesive. Generally, the second ply 86 of the cardboard 80 is regarded as an inner surface of the cardboard 80 as it is visually less appealing than the first ply 85. The first ply 85 may have decorative printings applied thereto.

Figure 2:
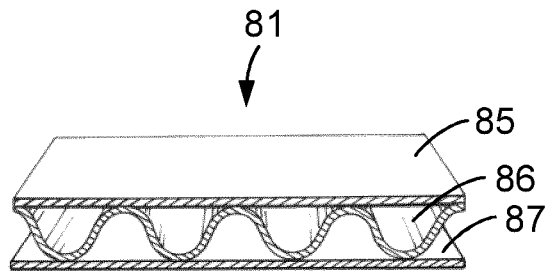

FIG. 2 shows a second exemplary type of cardboard 81, commonly referred to as simple wall cardboard or double face cardboard, comprising the first ply 85 and the second ply 86 present in the first exemplary type of cardboard 80, and further comprises a third ply 87 attached to the second ply 86 by means of an adhesive. The third ply 87 is planar. In many cases, either the first ply 85 or the third ply 87 has a better finishing than the other one, and that ply 85, 87 is usually regarded as an outer surface of the cardboard 81 and may have decorative printings applied thereto.

Figure 3:
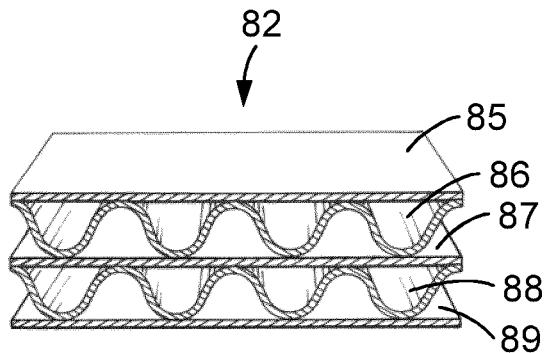

FIG. 3 shows a third exemplary type of cardboard 82, commonly referred to as double wall cardboard, comprising the first ply 85, the second ply 86, and the third ply 87 present in the second exemplary type of cardboard 81, and further comprises a fourth ply 88 that is corrugated and attached to the third ply 87 by means of an adhesive, and a fifth ply 89 that is planar and attached to the fourth ply 88 by means of an adhesive.

Figure 4:
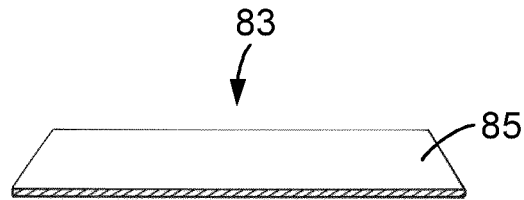

FIG. 4 shows a fourth exemplary type of cardboard 83 only comprising the first ply 85.

Figure 5A:
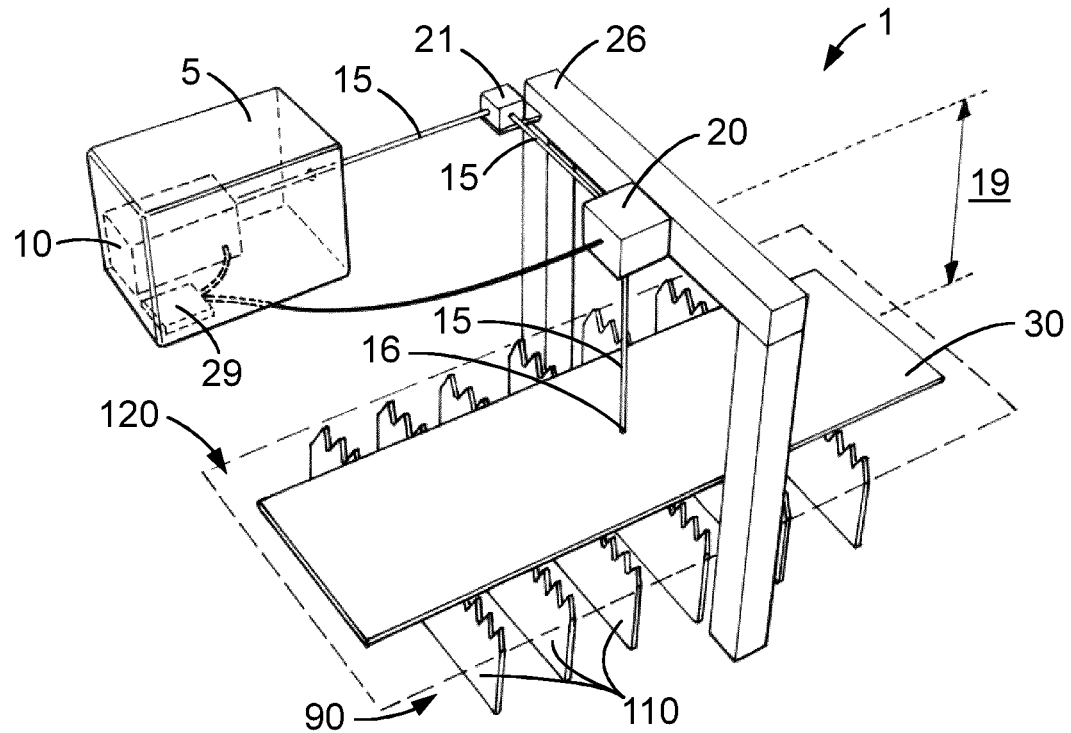
FIGS. 5A-5B show an apparatus according to an embodiment.

FIG. 5A shows an apparatus 1 according to an embodiment of the disclosure. The apparatus 1 comprises a laser 10, a scanner 20, a mirror 21 (at 45°) for redirecting a laser beam 15 of the laser 10 towards the scanner 20, a unit 29 for operating both the laser 10 and the scanner 20, and a support 90. The scanner 20 comprises two mirrors (not illustrated) for scanning a laser beam 15 of the laser 10 such that it may be aimed at different positions on a surface of a cardboard blank 30 resting on the support 90, particularly on a plurality of spaced apart metallic plates 110; the scanner 20 is arranged on a framework 26 of the apparatus 1. The apparatus 1 further comprises a housing 5 within which the laser 10, and the unit 29 are provided.

The laser 10 generally comprises optics such as one or more lenses for focusing and defocusing the beam 15 thereof. By way of example, when the laser 10 is a $CO_2$ laser (with radiation comprising a wavelength of 10.6 µm), the beam 15 may be already collimated. Further, the laser 10 may comprise a first lens that is fixed and which may be used for focusing the beam 15 as it reaches the scanner 20 (thus it may compensate the distance between the laser 10 and the scanner 20), and a second lens that may be moved together with the mirrors of the scanner 20 so that a spot 16 of the laser beam 15 remains focused on the surface of the cardboard blank 30 while the beam 15 is scanned (i.e. the spot 16 remains focused irrespective of the total distance that the beam 15 travels); such second lens makes possible to process cardboard of different thicknesses without having to change a distance between the scanner 20 and the cardboard to be processed. As it is known by the person skilled in the art, other optics such as an F-theta lens may be used for focusing the spot 16 of the laser beam 15.

The apparatus 1 is capable of processing cardboard, such as the cardboard blank 30. The apparatus 1 radiates towards the support 90 so as to irradiate the surface of the cardboard blank 30, and hence cut the cardboard blank 30 and/or form fold lines therein. To this end, the unit 29 controls both the operation of the laser 10 and the operation of the scanner 20.

The spaced apart metallic plates 110 of the support 90 are arranged parallel to the laser beam 15 when the laser beam 15 is irradiating the cardboard blank 30 perpendicularly. When the laser beam 15 is scanned its angle relative to the cardboard blank 30 and, thus, to the metallic plates 110, varies. Therefore, the laser beam 15 may reach the metallic plates 110 at an angle, namely obliquely, but not perpendicularly, so it is unlikely that it will reflect upwards. A supporting plane 120 is defined as the plane that comprises the part of the spaced apart metallic plates 110 that is or is to be in contact with the cardboard blank 30.

By adjusting the power of the laser 10 and the scanning speed of the laser beam 15 (i.e. the speed at which the spot 16 of the laser beam 15 moves on the surface of the cardboard blank 30 or on the plane 120 of the support 90 where the cardboard blank 30 may rest), something that is adjusted with the rotation of each mirror of the scanner 20, the laser 10 irradiates the surface of the cardboard blank 30 with the laser beam 15 following particular trajectories and removes material from the cardboard blank 30 so as to cut it and/or form the fold lines therein.

In some examples, the apparatus 1 further comprises a system or a device for transporting cardboard blanks. Such system or device takes cardboard blanks from a first position or station where cardboard blanks are piled, puts them on the support 90 for processing thereof, and takes them again to a second position or station where they are piled for additional processing (e.g. painting, coating, folding, etc.) or delivery thereof. To this end, the system or the device for transporting cardboard blanks may include, for instance but without limitation, a suction gripper or a robotic arm for moving the cardboard blanks.

In some other examples, the support 90 of the apparatus 1 is a conveyor that conveys and supports cardboard blanks.

Figure 5B:
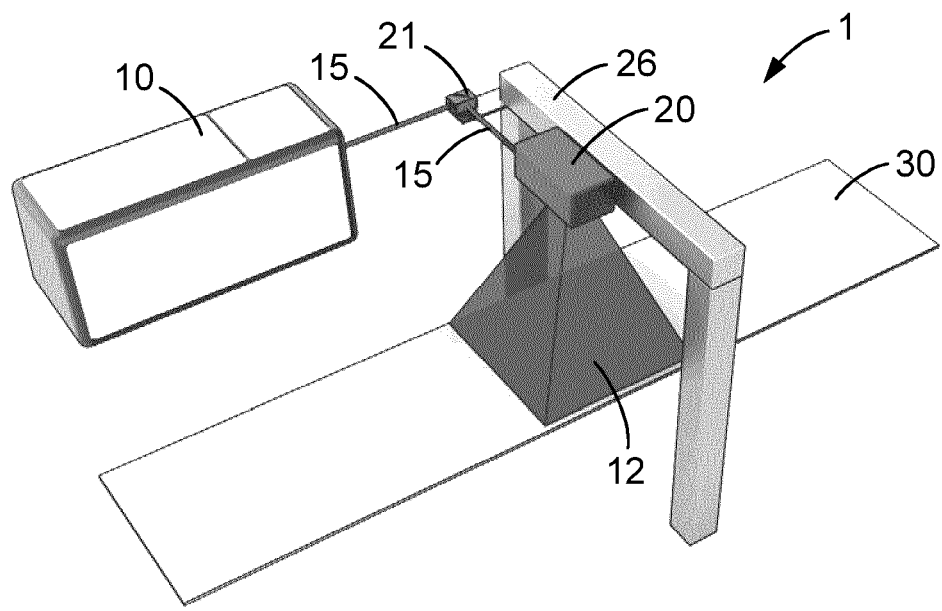

FIG. 5B partially shows the apparatus 1 of FIG. 5A from a different point of view (the unit 29 and the housing 5 are not illustrated). Illustrated in FIG. 5B is the laser 10, the scanner 20 provided in the framework 26, and a coverage area 12 (shown as a volume in the form of a pyramid for better illustrating a range of the scanner 20) of the laser beam 15 scanned with the scanner 20. In this sense, the laser 10 produces the beam 15 that may be aimed at any portion of the cardboard blank 30 within the coverage area 12. Albeit the coverage area 12 is represented as a square or rectangular area, it is apparent that the coverage area 12 is limited by the angular range of the mirrors of the scanner 20, which in turn determines the attainable reflections of the laser beam 15 with the mirrors, and thus edges of the coverage area 12 may be affected by these phenomena.

Even though the coverage area 12 of the laser 10 owing to the scanner 20 may cover a large surface of the cardboard blank 30, it is preferred to process cardboard blanks with the laser beam 15 being as close as possible to the center of the coverage area 12. As the laser beam 15 is aimed further away from said center, the angle formed between the laser beam 15 and the surface of the cardboard blanks becomes smaller (the angle being 90° when the laser beam 15 is aimed at the center of the coverage area 12), and thus a shape of the spot 16 of the laser beam 15 becomes elliptic, thereby spreading the amount of energy to be deposited over a larger surface. In addition, the material is removed from the cardboard blanks with such angle, something that is not desirable because the resulting edges are less crisp; further, in comparison with an angle of incidence closer to 90°, more material needs be removed in order to remove a same number of plies. The spread of energy over a larger surface causes that a lower amount of energy is deposited in each portion of the spot 16, hence material is removed from the cardboard blanks with less accuracy. In comparison with a circular spot (i.e. the laser beam 15 is close to the center of the coverage area 12), for removing the same number of plies with such an elliptic spot the irradiation takes more time.

Scanning the laser beam 15 closer to edges of the coverage area 12 is not preferred due to limited rotation of the mirrors of the scanner 20 which may difficult the correct processing of the cardboard. More material of the cardboard blank is removed with the laser when the laser beam is not perpendicular to the surface of the cardboard blank, and further the fold line(s) or the cut(s) formed is/are less crisp owing to the oblique irradiation. To this end, the apparatus 1 preferably irradiates the cardboard blank 30 according to the first pattern and/or the second pattern when the corresponding portion of the surface of the cardboard blank 30 is closer to the center of the coverage area 12 (so that the angle of incidence is closer to 90°). In those embodiments in which the cardboard blank 30 is conveyed, either continuously (i.e. not stopped while being processed) or intermittently (e.g. stopped once for complete processing with the apparatus, stopped and moves multiple times for progressive processing with the apparatus), the laser 10 irradiates the cardboard blank 30 based on the different time instants in which the different portions thereof will be within the coverage area 12, and preferably when said portions are closer to the center of the coverage area 12.

In some examples, a distance 19 between the scanner 20 and an upper plane 120 (shown with dashed lines for representing that it is an imaginary plane) of the support 90, measured as a perpendicular segment extending from the scanner 20 to the plane 120, is preferably between 50 cm and 200 cm. In some of these examples, the distance is between 75 cm and 125 cm, for instance approximately 100 cm.

Figure 6:
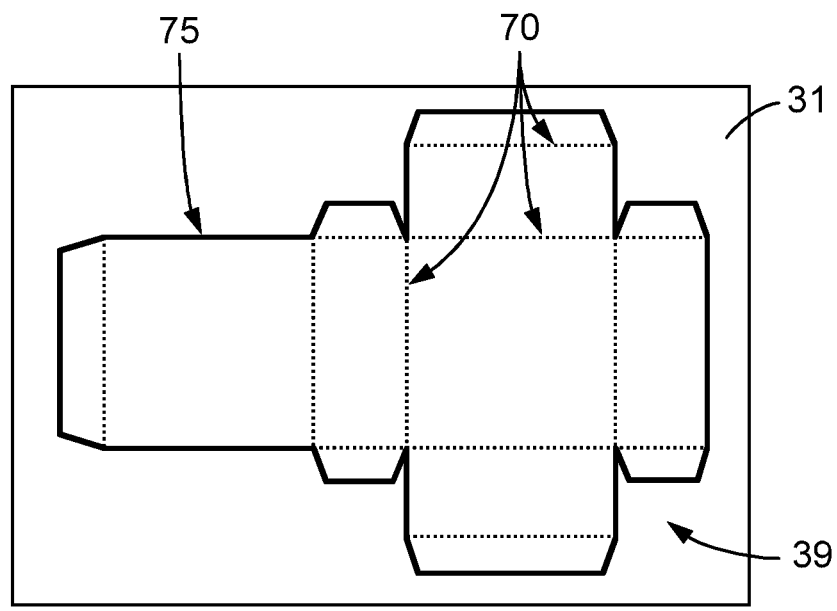
FIG. 6 shows a cardboard blank with folding and cutting lines formed therein.

FIG. 6 shows an exemplary cardboard blank 31. The cardboard blank 31 has been processed such that fold lines have been formed therein according to a first pattern 70 (shown with dotted lines for illustrative purposes) that comprises a first plurality of segments; the segments may include continuous and/or discontinuous lines, and further the segments may be linear and/or curved. Also, the cardboard blank 31 has been processed such that it has been cut according to a second pattern 75 (shown with solid lines for illustrative purposes) thereby providing a cardboard container 39 that is foldable. The second pattern 75 comprises a second plurality of segments each of which may be linear and/or curved. Such processing may be carried out with apparatuses and methods according to the present disclosure.

FIG. 7 shows exemplary fold lines 41, 42 formed in a cardboard blank 32. A first fold line 41 comprises a single segment (in the form of a dotted line) extending along a first direction of the cardboard blank 32. A second fold line 42 comprises two parallel segments (in the form of dotted lines) extending along the first direction of the cardboard blank 32. The two parallel segments of the second fold line 42 are separated by a distance 48 that is equal to or less than a thickness of the cardboard blank 32.

By way of example, if the cardboard blank 32 comprises plies according to the second exemplary type of cardboard 81 of FIG. 2, the first and the second fold lines 41, 42 may be formed by removing part of the material of the cardboard blank 32, particularly one of the first and the third plies 85, 87 (the portions thereof irradiated with the laser); or by removing the second ply 86 and either the first ply 85 or the third ply 87 (the portions thereof irradiated with the laser).

FIG. 8 shows exemplary fold lines 43 formed in a cardboard blank 33. Particularly, two fold lines 43 have been formed by removal of material from the cardboard blank 33. Each of the two fold lines 43 comprises three parallel segments (in the form of dashed lines), and a distance 49 from the segment at one side of a fold line 43 to the segment at the other side of the same fold line 43 is equal to or less than a thickness of the cardboard blank 33. With reference to the FIG. 8, the distance 49 is preferably measured from the left-most part of the fold line 43 (i.e. the left outer-most part of the left segment) to the right-most part of the fold line 43 (i.e. the right outer-most part of the right segment).

In the example of FIG. 8, the dashed lines of the segments are provided by portions 44a in which material is removed from the cardboard blank 33 sequentially with overlapping dots (corresponding to the spot of the laser), and portions 44b free of such dots. In other examples, the portions 44a are provided by removing material continuously with the spot of the laser, i.e. not interrupting irradiation on the surface of the cardboard blank 33 until reaching portions 44b, after which the irradiation is continued again.

FIG. 9 shows an exemplary fold line 45 formed in a cardboard blank 34. The fold line 45 comprises a plurality of segments (in the form of continuous lines) arranged with an angle with respect to a folding direction (i.e. a vertical direction according to the representation of FIG. 9). The plurality of segments comprises segments of shorter and longer lengths, which have been found to affect less the structural integrity of the cardboard blank 34 yet they make possible to fold the cardboard blank 34 along said fold line 45.

In the example of FIG. 9 the angle that each segment of the plurality of segments forms with respect to the folding direction is 45°. In other examples, said angle is greater than or equal to 15° and less than or equal to 75°, for instance but without limitation, the angle is approximately 15°, 30°, 60°, or 75°.

FIG. 10 shows an exemplary fold line 46 formed in a cardboard blank 35. A planar ply of the cardboard blank 35 is removed thereby revealing a corrugated ply of the cardboard blank 35, and hence forming the fold line 46. The planar ply may be removed by scanning a laser beam continuously following the path of the fold line 46 without blocking or disabling the laser, namely, the surface of the cardboard blank 35 is subject to the irradiation with the laser in a single continuous pass.

Figure 11:
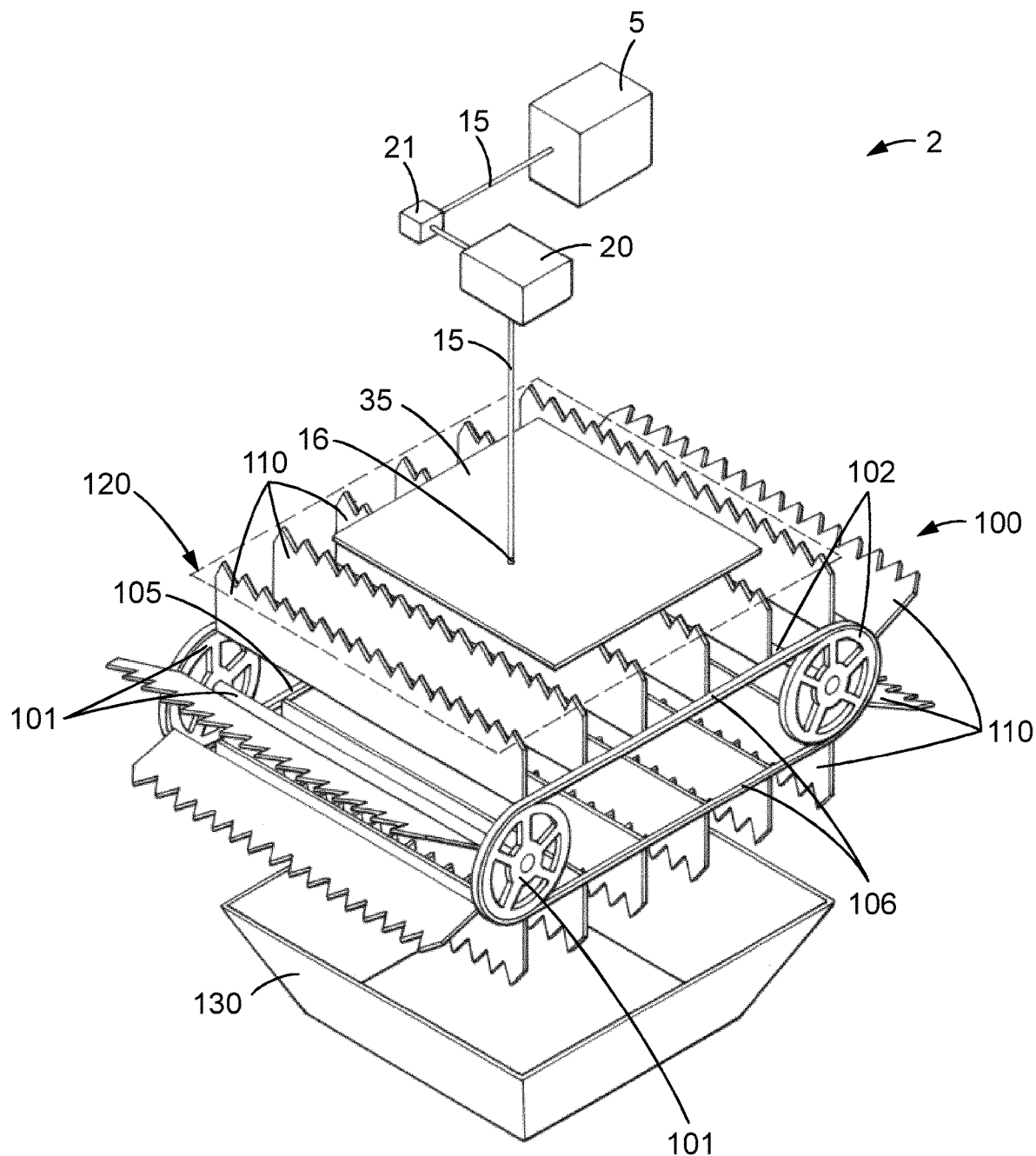

FIG. 11 shows an apparatus 2 for processing cardboard according to an embodiment. The apparatus 2 comprises a laser (within a housing 5), a scanner 20 arranged on a framework (not illustrated) for the laser comprising two mirrors (not illustrated), a mirror 21 for directing a laser beam 15 of the laser towards the scanner 20, and a unit (within the housing 5) operating both the laser and the scanner, as described for example with respect to the apparatus 1 of FIG. 5. The laser provides the laser beam 15 for irradiating a cardboard blank 35.

The apparatus 2 further comprises a conveyor 100 for conveying and supporting the cardboard blank 35, and a programmable logic controller (not illustrated), i.e. PLC, for controlling the conveyor 100. The conveyor 100 comprises a first axle 101, a second axle 102, a first chain 105, and a second chain 106. Both the first and the second chains 105, 106 are coupled to the first and the second axles 101, 102 so that they rotate together with the axles 101, 102. The first and the second axles 101, 102 are motorized. The conveyor 100 further comprises a plurality of spaced apart metallic plates 110 for supporting and conveying the cardboard blank 35. The cardboard blank 35 rests on top of the metallic plates 110, this part of the conveyor 100 defining the supporting plane 120 (as shown in FIGS. 5A-5B in relation to the support 90). A distance from the scanner 20 to the upper plane 120 is preferably but without limitation between 50 cm and 200 cm, in some cases between 75 cm and 125 cm, and in some cases the distance is approximately 100 cm.

The metallic plates 110 are coupled to both the first and the second chains 105, 106 in order to follow the same motion thereof. The plurality of spaced apart metallic plates 110 is arranged such that the metallic plates 110 at an upper part of the conveyor 100 are parallel to the laser beam 15 when the laser beam 15 is to irradiate the cardboard blank 35 perpendicularly. As the first and the second chains 105, 106 move, the metallic plates 110 advance and repeatedly cycle. Also, the metallic plates 110 comprise an edge with a saw geometry for deflecting the laser beam 15 in case it illuminates one of the metallic plates 110 while processing the cardboard blank 30.

The conveyor 100 comprises an encoder (not illustrated) that provides data relative to the operation of the conveyor 100 to the unit. The conveyor 100 may also comprise means for detecting a piece (e.g. an infrared photoelectric cell) that provides, to the unit, data relative to the position of cardboard blanks resting on the conveyor 100.

The apparatus 2 further comprises means 130 for deflecting the laser beam 15 and receiving cardboard scraps. The means 130 comprise metallic plates, each arranged with an angle with respect to the vertical in order to deflect the laser beam 15 should the beam reach the means 130 and thus not be reflected upwards. The metallic plates of the means 130 also funnel any scraps from the cardboard blank 35 that are produced while processing the cardboard blank 35 with the laser. The scraps may then be collected and thus the laser beam 15 may not accidentally burn them and start a fire.

While the apparatus 2 processes cardboard blanks such as the cardboard blank 35, smoke is generated owing to the irradiation with the laser. The smoke may get any of the laser, the lens, and the mirrors of the scanner 20 dirty thereby distorting the laser beam 15. Also, particles within the smoke could be irradiated with the laser beam 15 and thus worsen the processing of the cardboard blank 35 as the laser beam 15 does not irradiate it in a clean manner. Accordingly, the smoke must be absorbed from the bottom of the cardboard blank 35 so that it does not interfere with the apparatus 2 while it is in operation. To this end, the apparatus 2 may be part of a system that comprises a chamber with air absorbing means, such as a suction pump. In addition, the air absorbing means pull the cardboard blank 35 downwards against the metallic plates 110 thereby reducing the probability that the cardboard blank 35 will move while being processed. The apparatus 2 may further comprise such air absorbing means, and/or air blowing means that blow air downwards, for example a blower, so that in addition to making the airflow and getting out the smoke, any scraps of the cardboard that may have not fallen within the means 130 may also be pushed downwards.

Figure 12A:
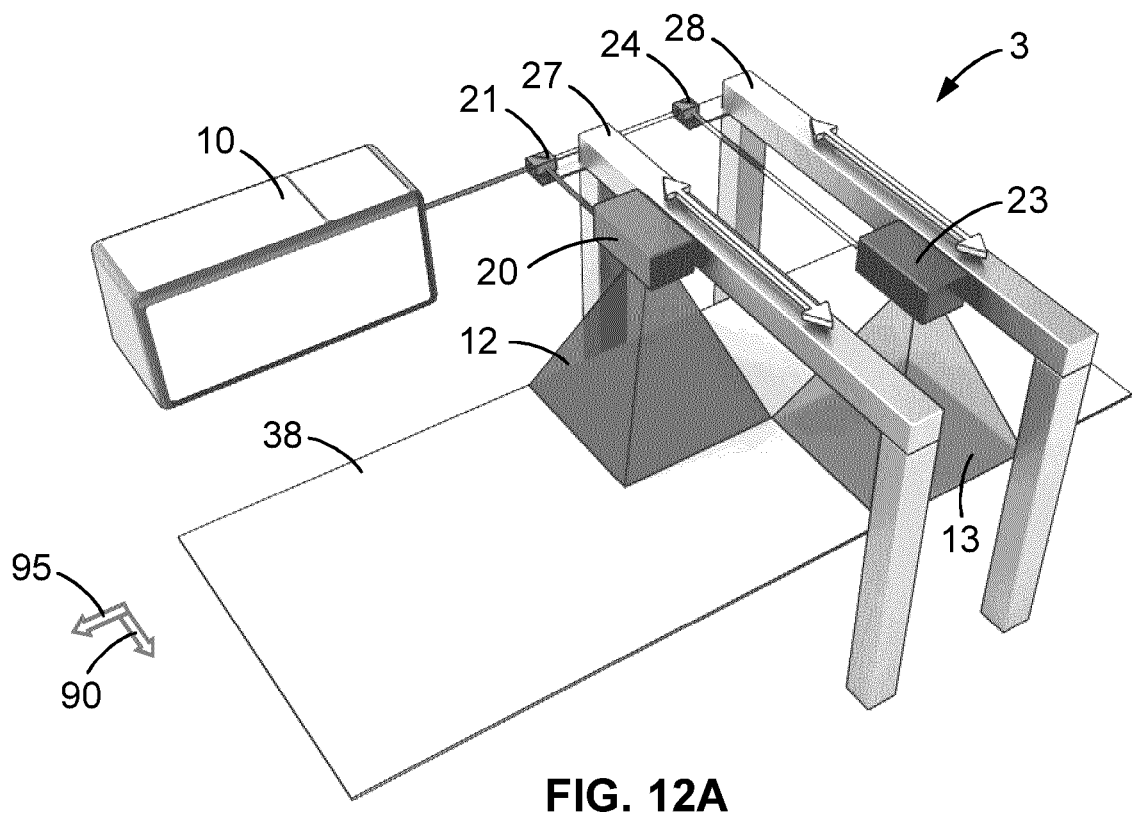
Figure 12B:
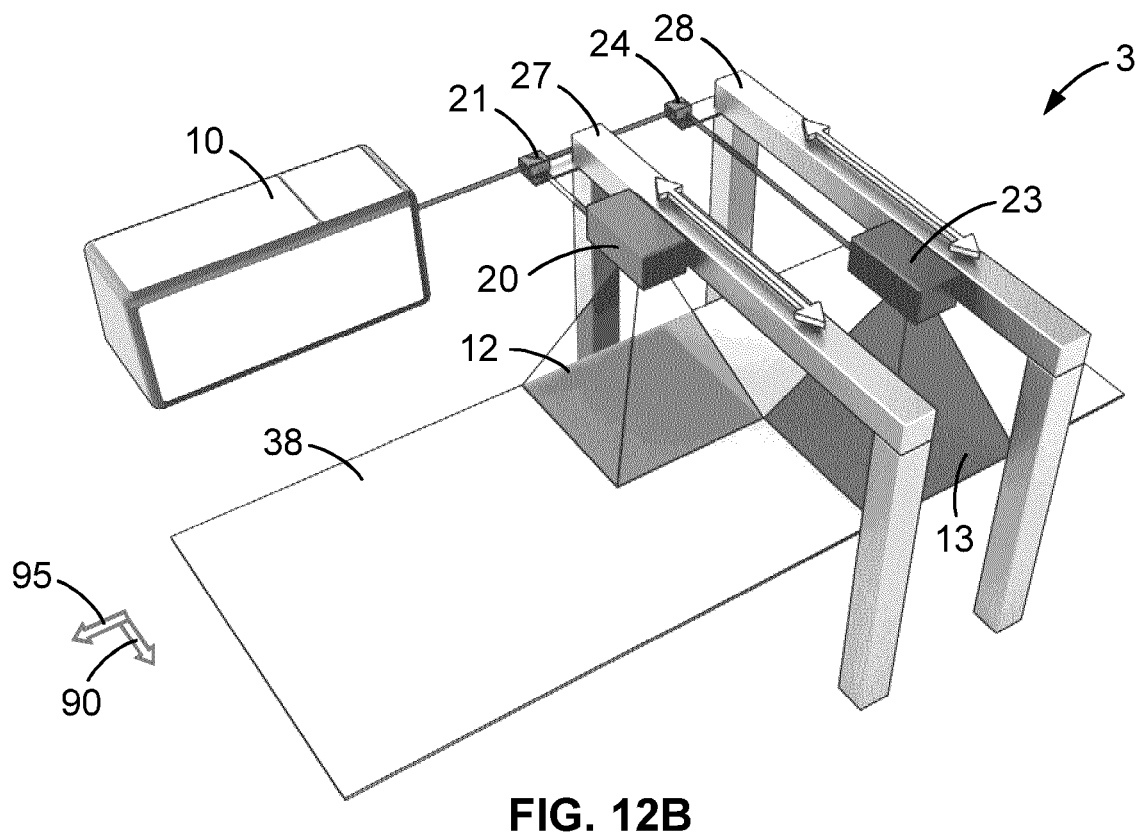

FIGS. 12A-12B partially show an apparatus 3 according to an embodiment. The apparatus 3 comprises a laser 10, a first scanner 20 with two mirrors (not illustrated) therein, a second scanner 23 with two mirrors (not illustrated) therein, and mirrors 21, 24 for directing a laser beam towards the first and the second scanners 20, 23, respectively.

The first scanner 20 is arranged on a first framework 27 of the apparatus 3, and the second scanner 23 is arranged on a second framework 28 of the apparatus 3. The apparatus 3 further comprises moving means for moving the first and the second scanners 20, 23, respectively, in a first direction 90 that may be parallel to a width dimension of the cardboard blank 38 (imaginary arrow shown for illustrative purposes only). The first scanner 20 may be moved along a length of the first framework 27, whereas the second scanner 23 may be moved along a length of the second framework 28 (as shown with the imaginary arrows on top of the first and the second frameworks 27, 28). In some other embodiments, the moving means of one or both of the first and the second frameworks 27, 28 are configured to move the first and/or the second scanners 20, 23, respectively, in a second direction 95 (imaginary arrow shown for illustrative purposes only) perpendicular to the first direction 90; the moving means may be configured to move the scanners in both the first direction 90 and the second direction 95. The moving means may comprise, for instance but with no limitation, motorized elements provided in guideways in each of the first and the second frameworks 27, 28 for displacing the scanners. The second direction 95 is preferably a direction that is parallel to a lengthwise dimension of the cardboard blank 38, and is preferably a direction in which the cardboard blank 38 is supplied to the apparatus 3 (e.g. the direction in which a conveyor conveys the cardboard blank 38).

The apparatus 3 further comprises a beam switch, and a unit programmed to operate the laser 10, the first scanner 20, the second scanner 23, the beam switch, and the moving means.

First and second coverage areas 12, 13 (shown as square or rectangular areas, but it is apparent that these are in fact limited by the angular range of the mirrors of each scanner) illustratively represent where on a surface of a cardboard blank 38 the beam of laser 10 may be aimed at with the first scanner 20 and the second scanner 23, respectively. When the first scanner 20 and/or the second scanner 23 are/is moved, the first coverage area 12 and/or the second coverage area 13 are/is also moved according to the movement of the scanner(s) 20, 23.

The apparatus 3 of FIGS. 12A-12B may be particularly suitable when a surface of the cardboard blank 38 to be processed is wider than the coverage area of the laser 10 with one of the first and the second scanners 20, 23. In embodiments in which the apparatus comprises a single laser and a single scanner with no moving means, the cardboard blank 38 would either have to be moved in the first direction 90, or have portions over the entire width processed sequentially (e.g. processing first a first half of the cardboard blank 38 along the entire length thereof, and processing afterwards a second half of the cardboard blank 38 along the entire length thereof).

The apparatus 3 with the first and the second scanners 20, 23 may sequentially process the cardboard blank 38 such that the beam of the laser 10 is first scanned with one of the first and the second scanners 20, 23, and afterwards scanned with the other one of the first and the second scanners 20, 23. The beam switch makes possible to alternate which scanner scans the beam of the laser 10.

In FIG. 12A, the beam switch provides the beam of the laser 10 to the first scanner 20 so that it may irradiate the surface of the cardboard blank 38 within the first coverage area 12 (the first coverage area 12 is shown with a color darker than that of the second coverage area 13 for illustrating this first configuration). In FIG. 12B, the beam switch provides the beam of the laser 10 to the second scanner 23 so that it may irradiate the surface of the cardboard blank 38 within the second coverage area 13 (the second coverage area 13 is shown with a color darker than that of the first coverage area 12 for illustrating this second configuration).

If the cardboard blank 38 is conveyed in the second direction 95 as shown with the arrow, it is preferred to start processing the cardboard blank 38 with the second configuration (FIG. 12B) since the first portion of the cardboard blank 38 that may be processed with the apparatus will be closer to the second coverage area 13 than to the first coverage area 12.

As illustrated in FIGS. 12A-12B, it may be preferable to provide the first and the second scanners 20, 23 such that the first and the second coverage areas 12, 13 cover as much width (the dimension corresponding to the first direction 90) of the cardboard blank 38 as possible. In some examples, the first and the second scanners 20, 23 are arranged such that the first and the second coverage areas 12, 13 overlap in one portion thereof. Overlapping portion(s) of coverage areas may be convenient for compensating distortion in the irradiation of cardboard with a laser that may occur when a scanner scans a laser beam thereof close to limiting edges of the coverage area; in one part of the overlapping portion(s) of coverage areas, a first laser beam scanned with a first scanner may be closer to a center of its corresponding coverage area than a second laser beam of the same or different laser is with respect to a center of its corresponding coverage area when scanned with a second scanner, and thus the first laser beam may be scanned with less distortion than the second laser beam. Further, in another part of the same overlapping portion(s) the second laser beam may be scanned with less distortion that the first laser beam due to a greater proximity thereof to a center of its corresponding coverage area.

Figure 13A:
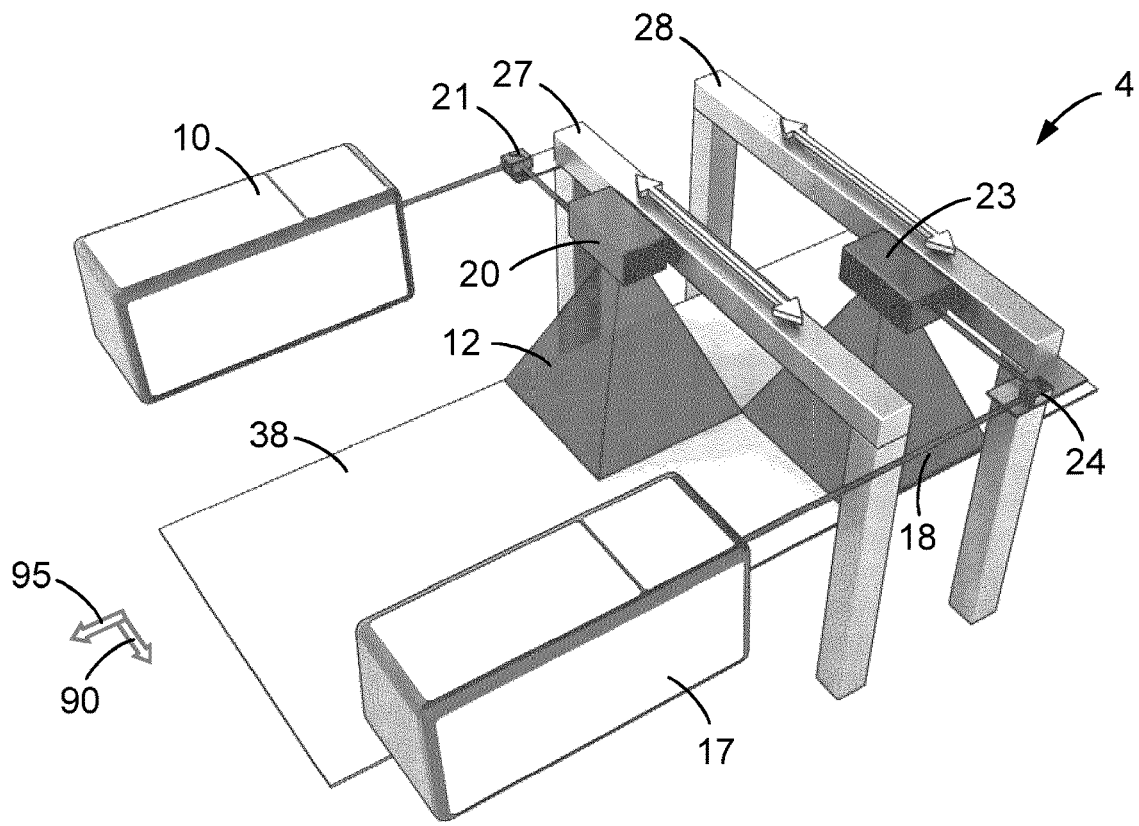
Figure 13B:
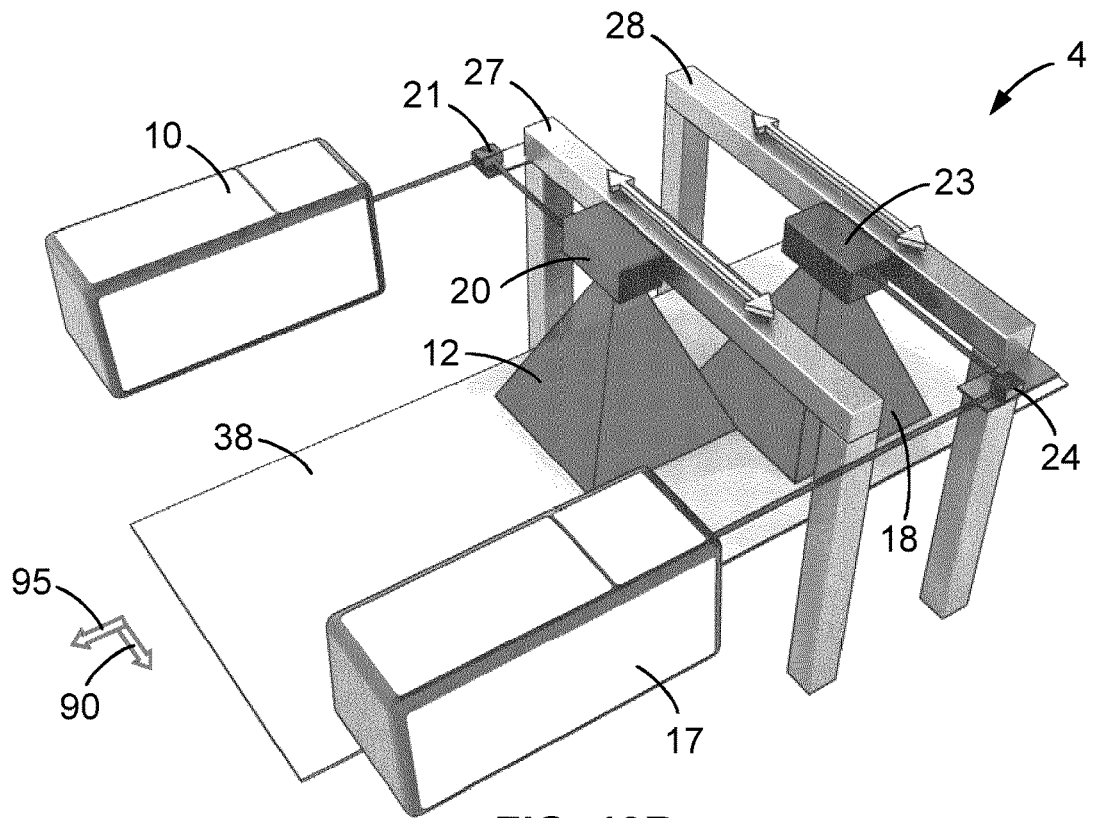

FIGS. 13A-13C partially show an apparatus 4 according to an embodiment. The apparatus 4 comprises a first laser 10 coupled to a first scanner 20 (through a first mirror 21), and a second laser 17 coupled to a second scanner 23 (through a second mirror 24).

The first and the second scanners 20, 23 are arranged on first and second frameworks 27, 28, respectively. The apparatus 4 further comprises moving means configured to move the first scanner 20 in a first direction 90 along a length of the first framework 27, and further configured to move the second scanner 23 in the first direction 90 along a length of the second framework 28 (as shown with the imaginary arrows on top of the first and the second frameworks 27, 28). The moving means comprise one or more displaceable units that are coupled to the first scanner 20, and one or more displaceable units that are coupled to the second scanner 23. In other examples the moving means are also configured to move one or both of the first and the second scanners 20, 23 in a second direction 95; for example one or more displaceable units move the first scanner 20 in two directions (e.g. the first and the second directions 90, 95), and one or more displaceable units move the second scanner 23 in two directions (e.g. the first and the second directions 90, 95).

The apparatus 4 further comprises a unit programmed to operate both lasers 10, 17, both scanners 20, 23, and the moving means.

In contrast to the apparatus 3 of FIGS. 12A-12B, the apparatus 4 of FIGS. 13A-13C is capable of simultaneously processing the cardboard blank 38 in two portions thereof. The first laser 10 has its beam scanned with the first scanner 20 so as to irradiate a first portion of the cardboard blank 38 within a first coverage area 12, and the second laser 17 has its beam scanned with the second scanner 23 so as to irradiate a second portion of the cardboard blank 38 within a second coverage area 18.

When one or both of the first and the second scanners 20, 23 is/are moved with the moving means, the corresponding coverage area or areas is/are also moved. Therefore, the first and the second lasers 10, 17 may irradiate different portions of the cardboard blank 38 even when the cardboard blank 38 is static while it is processed with the apparatus 4.

By way of example, in FIG. 13A a first configuration of the apparatus 4 is illustrated in which the first and the second scanners 20, 23 are arranged such that the first and the second coverage areas 12, 18 cover as much width (the dimension corresponding to the first direction 90) of a cardboard blank 38 as possible. In FIG. 13B a second configuration of the apparatus 4 is illustrated in which the first and the second scanners 20, 23 are arranged such that the first and the second coverage areas 12, 18 are adjacent to each other in the second direction 95, and slightly displaced one relative to the other in the first direction 90; in this configuration, wider cardboard blanks such as cardboard blank 38 may be processed faster since two portions thereof (at different locations relative to the first direction 90) may be irradiated at the same time with the first and the second lasers 10, 17, respectively. In FIG. 13C a third configuration of the apparatus 4 is illustrated in which the first and the second scanners 20, 23 are arranged such that the first and the second coverage areas 12, 18 are adjacent to each other in the second direction 95, and aligned in the first direction 90; in this configuration, narrower cardboard blanks such as cardboard blank 30 may be processed faster since two portions thereof (at different locations relative to the second direction 95) may be irradiated at the same time with the first and the second lasers 10, 17, respectively.

In some examples, the first and the second scanners 20, 23 are arranged such that the first and the second coverage areas 12, 18 overlap in one portion thereof. In some examples, the first and the second scanners 20, 23 are arranged such that the first and the second coverage areas 12, 18 are provided side-by-side (in the first direction 90) and covering as much width of the cardboard blank 38 as possible.

In some examples, the apparatus further comprises third and fourth lasers coupled with third and fourth scanners, respectively. Each of the third and the fourth lasers and scanners may operate and be operated as disclosed in the present disclosure with reference to the first and/or the second lasers. In this sense, the third laser may irradiate a cardboard blank in order to provide at least one fold line according to a pattern (e.g. fifth pattern) and/or to cut the cardboard blank according to a pattern (e.g. sixth pattern). Further, the fourth laser may irradiate a cardboard blank in order to provide at least one fold line according to a pattern (e.g. seventh pattern) and/or to cut the cardboard blank according to a pattern (e.g. eighth pattern).

FIG. 14 shows, in a block diagram form, a method 200 according to an embodiment.

The method 200 comprises a first step 205 of irradiating a surface of a cardboard blank (for example the cardboard blank 30 of FIG. 5 or 10) with a laser (for example the laser 10 of apparatus 1, 2, or 3 of FIG. 5, 10 or 12A-12B, respectively, or one of the first and the second lasers 10, 17 of apparatus 4 of FIGS. 13A-13C) in order to remove material from the cardboard blank according to a first pattern (for example the first pattern 70 of FIG. 6, or a pattern of any of the fold lines 41-46 of FIGS. 7-10).

The method 200 further comprises a second step 206 of irradiating the surface of the cardboard blank with a laser in order to remove material from the cardboard blank according to a second pattern (for example the second pattern 75 of FIG. 6). The second step 206 may be carried out after carrying out the first step 205 with a same or a different laser, or it may also be carried out simultaneously with the first step 205 with a laser different from that used for irradiation in the first step 205.

FIG. 15 shows, in a block diagram form, a method 201 according to an embodiment. The method 201 comprises the same steps of the method 200 of FIG. 14 but in reverse order, the second step 206 is carried out first, and then the first step 205.

Depending on the complexity of the first and the second patterns, or where on the surface of the cardboard blank the laser must irradiate based on the first and the second patterns, it may be more convenient to first perform the cuts in the cardboard blank and then form fold lines therein with the steps of the method 201. By way of example, if the steps of the method 201 are to be carried out with a same laser while the cardboard blank is being conveyed, it may be preferable to start irradiating the surface of the cardboard blank with the laser in order to remove material from the cardboard blank according to the second pattern if the corresponding portion to be irradiated is partially or completely within a coverage area of the scanner. It may happen that at that time, the portion of the surface of the cardboard blank to be irradiated with the laser in order to remove material therefrom according to the first pattern is not (partially or completely) within the coverage area of the scanner yet, thus in this case it would take less time to process the cardboard blank with the method 201 than with the method 200 of FIG. 14.

FIG. 16 shows, in a block diagram form, a method 210 according to an embodiment.

The method 210 comprises a first step 215 of irradiating a surface of a cardboard blank with a laser (for example the laser 10 of apparatus 1, 2, or 3, or one of the first and the second lasers 10, 17 of apparatus 4) in order to provide at least one fold line according to a first pattern (for example the first pattern 70, or a pattern of any of the fold lines 41-46) by removing at least a portion of a ply (e.g. the portion of a ply, a ply, or some plies) of a first irradiated portion of the cardboard blank (for example the cardboard blank 30).

The method 210 further comprises a second step 216 of irradiating the surface of the cardboard blank with a laser in order to cut the cardboard blank according to a second pattern (for example the second pattern 75) by removing all plies of a second irradiated portion of the cardboard blank. The second step 216 may be carried out after carrying out the first step 215 with a same or a different laser, or it may also be carried out simultaneously with the first step 215 with a laser different from that used for irradiation in the first step 215.

FIG. 17 shows, in a block diagram form, a method 211 according to an embodiment. The method 211 comprises the same steps of the method 210 of FIG. 16 but in reverse order, the second step 216 is carried out first, and then the first step 215.

In some embodiments, one or both of the first and the second steps 205-206, 215-216 of the methods 200-201, 210-211, respectively, is/are carried out while the cardboard blank is in motion owing to a conveyance of the same (for example with the conveyor 100 of the apparatus 2 of FIG. 11).

In some embodiments, the methods 200-201, 210-211 further comprise additional steps as those described with reference to the first step 205, 215 and the second step 206, 216.

In some embodiments, the steps of the methods 200-201, 210-211 are repeated with additional lasers (e.g. with a second laser in order to irradiate according to third and/or fourth patterns, with a third laser in order to irradiate according to fifth and/or sixth patterns, and with a fourth laser in order to irradiate according to seventh and/or eighth patterns) on a same cardboard blank or on different cardboard blanks.

In some examples, the cardboard blanks 30-35, 38 comprise plies according to the first exemplary type of cardboard 80. In some other examples, the cardboard blanks 30-35, 38 comprise plies according to the second exemplary type of cardboard 81. In some other examples, the cardboard blanks 30-35, 38 comprise plies according to the third exemplary type of cardboard 82. In some other examples, the cardboard blanks 30-35, 38 comprise a ply according to the fourth exemplary type of cardboard 83. It is readily apparent that, within the scope of the present disclosure, the cardboard blanks 30-35, 38 may comprise plies according to types of cardboard other than the first, second, third, and fourth types of cardboard 80-83 of FIGS. 1-4, e.g. triple wall cardboard.

In some examples, the cardboard blanks 30-35, 38 have been coated or designs have been printed thereon prior to the processing thereof with apparatuses and/or methods according to the present disclosure. In some examples, the cardboard blanks 30-35, 38 are coated or designs printed thereon after the processing thereof with apparatuses and/or methods according to the present disclosure.

It is readily apparent that in some examples the apparatuses 3, 4 of 12A-12B, 13A-13C may further comprise at least one of: the conveyor, the means for deflecting a laser beam, the air absorbing means, the air blowing means, and combinations thereof, as described with reference to the apparatus 2 of FIG. 11. In some examples, the apparatus 1 of FIGS. 5A-5B may also comprise at least one of: the means for deflecting a laser beam, the air absorbing means, the air blowing means, and combinations thereof. Further, in some examples the apparatuses 1, 2 of FIGS. 5A-5B and 11 may also comprise a second laser, and in some examples also a third laser and a fourth laser.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. An apparatus for removing material from a cardboard blank, comprising:
   a first laser;
   a first scanner scans a laser beam of the first laser;
   a conveyor for cardboard blanks; and
   a unit programmed to operate the first laser and the first scanner, having the first laser radiates towards the conveyor with a first laser power while scanning, according to a first pattern, the laser beam of the first laser with a first scanning speed;
   wherein the first laser power is greater than or equal to 0.5 kW;
   wherein the first scanning speed is greater than or equal to 2000 mm/s and less than or equal to 25000 mm/s, the first scanning speed being a speed at which a spot of the laser beam moves with respect to a plane of the conveyor; and
   wherein the unit is further programmed to operate the first scanner and the first laser such that radiation while scanning the laser beam thereof is adjusted based on speed of the conveyor,
   wherein the unit is further programmed to operate the first laser and the first scanner, wherein the first laser radiates towards the conveyor with a second laser power while scanning, according to a second pattern, the laser beam of the first laser with a second scanning speed;
   wherein the second laser power is greater than or equal to 0.5 kW; and
   wherein the second scanning speed is greater than or equal to 500 mm/s and less than or equal to 10000 mm/s, the second scanning speed being the speed at which the spot of the laser beam moves with respect to the plane of the conveyor.

2. The apparatus of claim 1, wherein the unit is further programmed to change the first scanning speed and/or the first laser power while the first laser radiates and the laser beam thereof is scanned according to the first pattern.

3. The apparatus claim 1, wherein:
   the conveyor comprises at least two motorized axles, and a plurality of spaced apart metallic plates for conveying and supporting cardboard blanks;
   the plurality of spaced apart metallic plates are coupled to the at least two motorized axles; and
   the metallic plates are arranged such that, when they are on an upper side of the conveyor, they are parallel to the laser beam of each laser of the device; and
   each metallic plate comprises at least one side with a saw geometry.

4. The apparatus claim 1, wherein the conveyor (100) is configured to convey at a speed greater than or equal to 50 mm/s and less than or equal to 5000 mm/s.

5. The apparatus claim 1, wherein the unit is further programmed to change the speed of the conveyor while the first laser radiates and the laser beam thereof is scanned according to the first pattern.

6. The apparatus of claim 1, wherein the unit is further programmed to change the second scanning speed and/or the second laser power while the first laser radiates and the laser beam thereof is scanned according to the second pattern.

7. The apparatus of claim 1, further comprising moving means configured to move the first scanner in one direction or two perpendicular directions; wherein the unit is further programmed to operate the moving means.

8. The apparatus of claim 1, further comprising:
a second scanner configured to scan the laser beam of the first laser; and
a beam switch;
wherein the unit is further programmed to operate the beam switch so as to sequentially scan the laser beam of the first laser with the first and the second scanners.

9. The apparatus of claim 1, further comprising:
a second laser; and
a second scanner configured to scan a laser beam of the second laser;
wherein the unit is further programmed to operate the second laser and the second scanner such that the second laser radiates with the first laser power while the laser beam thereof is scanned, according to the first pattern, the second pattern or a third pattern, with the first scanning speed and/or with the second scanning speed and/or with the second laser power while the laser beam thereof is scanned, according to the first pattern, the second pattern or a third pattern.

10. The apparatus claim 1, wherein the unit is programmed to operate the first laser and the first scanner such that radiation of the first laser while scanning the laser beam thereof according to the second pattern is carried out after radiation of the first laser while scanning the laser beam thereof according to the first pattern.

* * * * *